US012771658B2

(12) United States Patent
Hu et al.

(10) Patent No.: US 12,771,658 B2
(45) Date of Patent: Oct. 20, 2026

(54) LLM FINE-TUNING FOR CHATBOT

(71) Applicant: ORACLE INTERNATIONAL CORPORATION, Redwood Shores, CA (US)

(72) Inventors: Yazhe Hu, Bellevue, WA (US); Mengqing Guo, Issaquah, WA (US); Zheng Wang, Sammamish, WA (US); Tao Sheng, Bellevue, WA (US); Jun Qian, Newcastle, WA (US); Vinod Mamtani, Bellevue, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/768,363

(22) Filed: Jul. 10, 2024

(65) Prior Publication Data

US 2025/0097171 A1 Mar. 20, 2025

Related U.S. Application Data

(60) Provisional application No. 63/538,663, filed on Sep. 15, 2023.

(51) Int. Cl.
*H04L 51/02* (2022.01)
*G06F 8/35* (2018.01)
(Continued)

(52) U.S. Cl.
CPC ................ *H04L 51/02* (2013.01); *G06F 8/35* (2013.01); *G06F 40/226* (2020.01);
(Continued)

(58) Field of Classification Search
CPC ........... H04L 51/02; H04L 51/04; G06F 8/35; G06F 40/226; G06F 8/36; G06F 40/30;
(Continued)

(56) References Cited

U.S. PATENT DOCUMENTS 11,749,264 B2 * 9/2023 Wu ........................ G06F 40/35 704/257
2023/0376697 A1 * 11/2023 Chow ................. G06N 3/0475
(Continued)

OTHER PUBLICATIONS

Open AI API: "Fine Tuning—Learn How to Customize A Model for Your Application", retrieved from https//platform.openai.com/docs/guides/fine-tuning on Nov. 30, 2023 ( pgs).
(Continued)

*Primary Examiner* — Soe Hlaing
(74) *Attorney, Agent, or Firm* — Kraguljac Law Group LLC

(57) ABSTRACT

Systems, methods, and other embodiments automated fine-tuning of chatbot performance for large language models are described herein. In one embodiment, a method accesses a collection of sample conversations between two entities. An individual sample conversation includes one or more rounds of natural language example prompt by a querent and example response by an agent. The method fine-tunes an LLM to generate responses in natural language based on a chatbot loss function that evaluates first responses generated by the LLM to the example prompts by the querent. The method generates an evaluation score for performance of the tuned LLM as a chatbot based on second responses generated by the tuned LLM to test prompts from a test conversation. And, the method automatically signals that the fine-tuning of the tuned LLM is complete in response to the evaluation score satisfying a threshold.

20 Claims, 4 Drawing Sheets

(51) Int. Cl.
*G06F 40/226* (2020.01)
*G06N 3/0895* (2023.01)
*G06N 3/091* (2023.01)
*H04L 51/04* (2022.01)

(52) U.S. Cl.
CPC ........... *G06N 3/0895* (2023.01); *G06N 3/091* (2023.01); *H04L 51/04* (2013.01)

(58) Field of Classification Search
CPC ....... G06F 40/35; G06F 40/56; G06N 3/0895; G06N 3/091
See application file for complete search history.

(56) References Cited

U.S. PATENT DOCUMENTS

| | | | | |
|---|---|---|---|---|
| 2023/0421373 | A1* | 12/2023 | Ryan | H04L 9/0866 |
| 2024/0095455 | A1* | 3/2024 | Sharma | G16H 10/60 |
| 2024/0283820 | A1* | 8/2024 | Kochman | G06N 3/0985 |
| 2025/0021842 | A1* | 1/2025 | Bernstein | G06N 5/02 |

OTHER PUBLICATIONS

Lewandowska, Paulina: "Creating a Human-Like Chatbot: A Step-by-Step Guide to Training ChatGBT", retrieved from https://nextrope.com/creating-a-human-like-chatbot-a-step-by-step-guide-to-training-chatgpt on Nov. 30, 2023 (23 pgs).
Kumar, Manoj: "Building Chatbots with Open-Source Large Language Models", retrieved from https://medium.com/ @careerInAI/building-chatbots-with-open-source-large-language-models-a6135b 149d68 on Nov. 30, 2023 (8 pgs).
Olasimbo Arigbabu, PhD: "Fine-Tuning OpenAI GPT-3 to Build Custom Chatbot", retrieved from Medium.com—https://medium.com/@olahsymbo/fine-tuning-openai-gpt-3-to-build-custom-chatbot-fe2dea524561, Jan. 26, 2023 (8pgs).
Susie Stulz: "Enhancing and Fine Tuning Large Language Models (LLMs)", retrieved from Blog/Enhancing and Fine Tuning Large Language Models, Oct. 19, 2023 (8 pgs).
Arun Shankar: "Building A Multi-Turn Chatbot with GPT and SageMaker: A Step-by-Step Guide", retrieved from ITNEXT.io—https://itnext.io/building-a-multi-turn-chatbot-with-gpt-and-sagemaker-a-step-by-step-guide-7d75f33ccea1, Feb. 26, 2023 (18 pgs).
Ekaterina Svikhnushina et al.: "Approximating Online Human Evaluation of Social Chatbots with Prompting", retrieved from arXiv:2304.05253v2 [cs. CL] Aug. 25, 2023 (15 pgs).
Debarag Banerjee et al.: "Benchmarking LLM Powered Chatbots: Methods and Metrics", retrieved from arXiv:2308.04624v1 [cs.CL] Aug. 8, 2023 (8 pgs).
Luv Bansal: "LLM Benchmarking: How to Evaluate Language Model Performance", retrieved from Medium.com—https://luv-bansal.medium.com/benchmarking-llms-how-to-evaluate-language-model-performance-b5d061cc8679, Nov. 1, 2023 (5 pgs).
Lmsys Org: "Chatbot Arena Conversation Dataset Release", retrieved from https://lmsys.org/blog/2023-07-20-dataset/, Jul. 20, 2023 (4 pgs).
Lianmin Zheng, et al.: "Judging LLM-as-a-Judge with MT-Bench and Chatbot Arena", retrieved from arXiv:2306.05685v3 [cs. CL] Oct. 15, 2023, 37th conference on Nural Information Processing Systems (NeurIPS2023) Track on Datasets and Benchmarks (29 pgs).
Bryan M. Li: "A Transformer Chatbot Tutorial with TensorFlow 2.0", retrieved from TensorFlow Blog dated May 29, 2019 (18 pgs).
P. Elakkiya, et al.: "Self-Learning Conversational Al Chatbot Using Natural Language Processing", International Journal of Advanced Research in Science, Computer Technology (IJARSCT), vol. 2, Issue 1, Jun. 2022 (6 pgs).
Prashanthi Anand Rao: "Mastering the Art of Chatbot Conversation: Model Evaluation and Fine-Tuning for Machine Learning Success—Part II", retrieved from https://nrao-prashanthi.medium.com/mastering-the-art-of-chatbot-converation-model-evaluation-and-fine-tuning-for-machine-learning-08e1b2e61012 on Nov. 30, 2023 (13 pgs).
Atharva Joshi, et al.: "Evaluation of Transformer Model for Conversational Chatbots Using Cosine Similarity Technique", International Journal for Research in Applied Science & Engineering Technology (IJRASET), ISSN: 2321-9653; IC Value: 45.98; SJ Impact Factor: 7.429, vol. 9, Issue X Oct. 2021 (6 pgs).

* cited by examiner

LLM FINE-TUNING FOR CHATBOT

CROSS REFERENCE TO RELATED APPLICATIONS

This disclosure claims the benefit of U.S. Provisional Patent Application Ser. No. "63/538,663" filed Sep. 15, 2023, titled "Large Language Model Fine-Tuning", inventors: Yazhe Hu, Zheng Wang, Mengqing Guo, Tao Sheng, Jun Qian, & Vinod Mamtani, and assigned to the present assignee, which is incorporated by reference herein in its entirety.

BACKGROUND

A large language model (LLM) is an artificial intelligence system that has been trained on vast amounts of text data to generate appropriate text responses to human language prompts. A LLM is capable of performing many diverse tasks, such as operating as a ChatBot—a system configured to mimic human conversational interaction. It is not currently possible to automatically evaluate and improve the performance of the LLM as a ChatBot.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
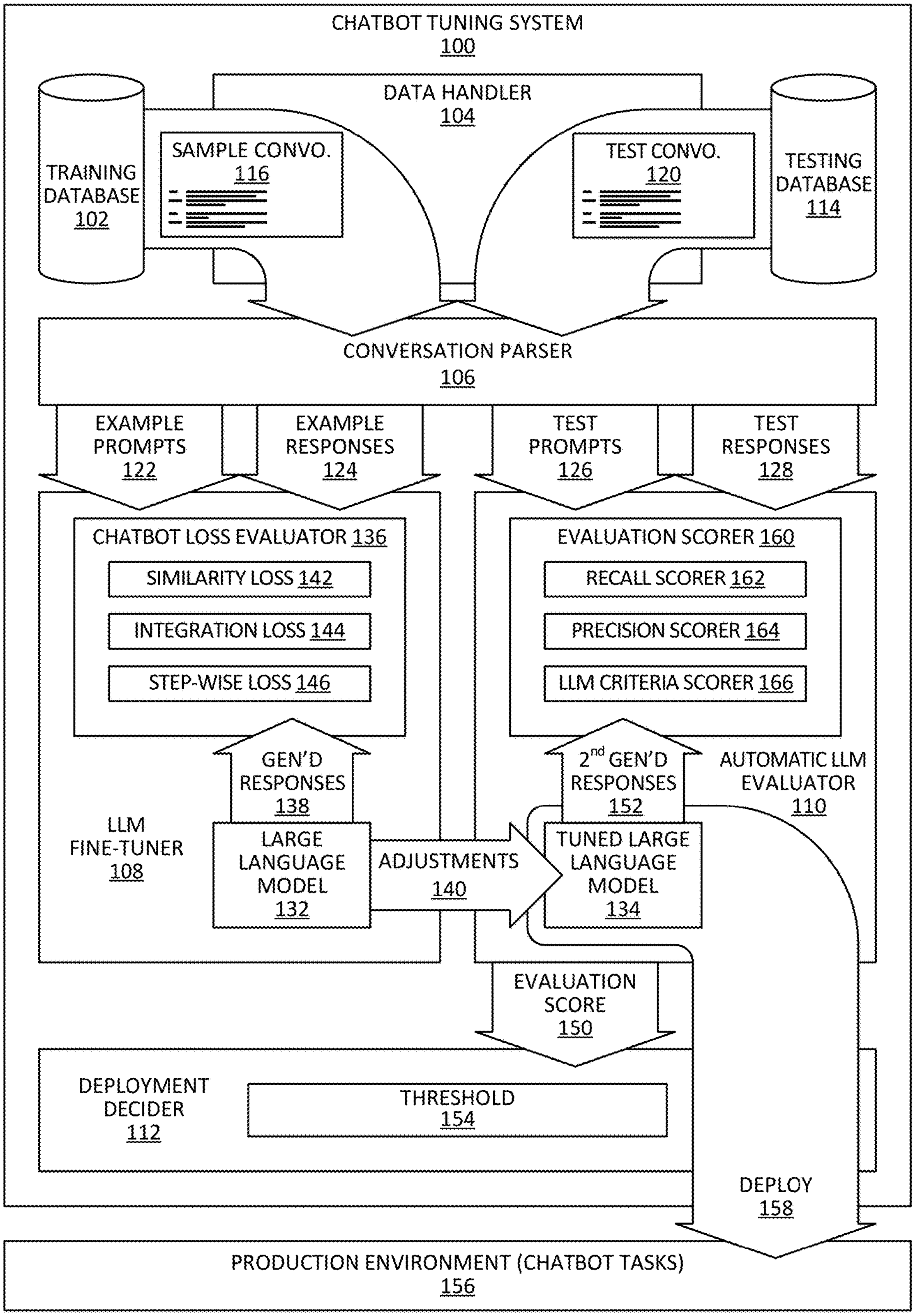
FIG. 1 illustrates one embodiment of a ChatBot tuning system associated with automated LLM fine-tuning for ChatBots.

Systems, methods, and other embodiments are described herein that provide automated fine-tuning of ChatBot interaction by large language models (LLMs). In one embodiment, a ChatBot tuning system automatically fine-tunes an LLM to improve performance of the LLM as a ChatBot. For example, the ChatBot tuning system automatically adjusts the LLM to cause the LLM to generate outputs that are more closely aligned with expectations for generating responses to chat-style prompts or instructions to the LLM. For example, adjustments by the fine-tuning process may improve the capability of the LLM to generate appropriate and contextually relevant responses over one or more rounds of conversation. And, for example, the ChatBot tuning system automatically evaluates improvement of LLM ChatBot performance in order to control deployment of the improved LLM to a production environment. In one embodiment, the LLM ChatBot tuning system quantifies improvement to the performance of the LLM at the task of generating chat-style responses, rendering the improvement verifiable.

In one embodiment, the ChatBot tuning system implements a pipeline for LLM fine-tuning on ChatBot tasks. In one embodiment, the ChatBot tuning system is a clear improvement over traditional techniques for LLM fine-tuning to improve ChatBot performance. Unlike traditional techniques which use prompt engineering or in-context learning to improve ChatBot ability of an LLM, in one embodiment, the ChatBot tuning system integrates use of specialized ChatBot training data—for example, records of chat-style conversations—with automated evaluation of iterative improvement to the LLM. In one embodiment, the pipeline implemented by the ChatBot tuning system uses the conversations to fine-tune LLM weights for optimized ChatBot performance. Then, the pipeline automatically tests the tuned LLM as a ChatBot to determine the improvement/degradation of the fine-tuned LLM to determine whether or not the LLM weights for ChatBot are improved over prior weights. In one embodiment, the ChatBot tuning system automatically evaluates and analyzes the ability of the LLM to resolve issues presented by the querent in chat conversation concisely and correctly. This removes dependence on manual review of generated chat responses for verification of the improvement, and consequent deployment decisioning.

And, in one advantageous improvement, the use of golden samples of conversation that have been pre-determined (labeled) to represent satisfactory performance by the chat agent can (in one embodiment) be removed entirely from a high-volume training phase of the fine-tuning process, and can (in one embodiment) be restricted entirely to a low-volume testing or validation phase of the fine-tuning process. Instead, in the training phase, unlabeled records of conversations may be used to improve performance of the LLM as a ChatBot.

Definitions

As used herein, the term "ChatBot" refers to a software application configured to simulate human conversation. In one embodiment, an LLM may be configured to perform as a ChatBot. For example, a ChatBot may interact with users or other querents by text or voice, providing responses to user inputs in a way that mimics human communication.

As used herein, the term "fine-tuning" refers to the process of taking a pre-trained LLM and further training it on a specific task or domain-such as chat-style conversations between a querent (e.g., a customer or other user) and an agent (such as a ChatBot or human service representative)—using a dataset that is targeted to the specific task or domain.

As used herein, the term "round" refers to one pair or exchange of an input prompt to the LLM and a response to the prompt by the LLM.

As used herein, the term "human language" (or "natural language") refers to a language that is used among humans for linguistic communication, such as a language that people use in everyday conversations, reading, and writing. Example natural languages include English, Spanish, Mandarin, Hindi, Arabic, and a wide variety of others. For purposes of this application, the terms include classical languages such as Latin, Sanskrit, and Literary Chinese, and constructed or auxiliary languages such as Esperanto and Interlingua.

As used herein, the term "recall" refers to an extent to which terms, operators, words (or other tokens), or phrases from a reference or sample text (such as an example chat response) also appear in an LLM-generated text (such as a generated chat response). More formally, recall indicates a proportion of relevant items in a first text that also occur in a second text.

As used herein, the term "precision" refers to an extent to which terms, operators, words, or other tokens appearing in an LLM-generated text also appeared in a corresponding reference or example text. Precision thus indicates a proportion of items in the LLM-generated text that preserve meanings expressed in the reference text. In one embodiment, precision may further indicate an extent to which the tokens appear in the same order in both a reference or sample text and an LLM-generated text.

It should be understood that no action or function described or claimed herein is performed by the human mind. No action or function described or claimed herein can be practically performed in the human mind. An interpretation that any action or function described or claimed herein can be performed in the human mind is inconsistent with and contrary to this disclosure.

Example ChatBot Tuning System for LLMs

FIG. 1 illustrates one embodiment of a ChatBot tuning system 100 associated with automated LLM fine-tuning for ChatBot. ChatBot tuning system 100 includes components for (i) automatically fine-tuning an LLM to generate human language chat responses more successfully based on example conversations, (ii) automatically testing the extent to which the performance of the LLM has improved at the task of chat responses using a golden benchmarking dataset of test conversations that are specially chosen as examples due to the satisfactory level of performance of the chat agent. In one embodiment, the components of ChatBot tuning system 100 include training database 102, data handler 104, conversation parser 106, LLM fine-tuner 108, automatic LLM evaluator 110, deployment decider 112, and testing database 114.

In one embodiment, data handler 104 is configured to access collections of conversations between two entities. In one embodiment, to access a given collection, data handler 104 is configured to establish a connection to the database that holds the collection of conversations, execute queries that retrieve the conversations from the database, and store the retrieved conversations for subsequent access and analysis by other portions of ChatBot tuning system 100. For example, data handler 104 may be configured to temporarily store or cache conversations until they are collected by conversation parser 106.

In one embodiment, the conversations are held in the databases in a format similar to that shown below in Table 1. One collection of conversations—training database 102—includes sample conversations 116 that were designated for training the LLM to improve performance of the LLM as a ChatBot. For example, training database 102 is a relatively high-volume database of sample conversations 116 that have been gathered from records of previous conversations between agents and querents. Sample conversations 116 may be un-labeled or otherwise un-vetted as to whether the performance of the agent in the conversation is or is not satisfactory.

Another collection of conversations—testing database 114—includes test conversations 120 that were designated as references for testing the trained LLM to determine an extent to which performance of the LLM as a ChatBot is improved. Similar to the sample conversations 120, the test conversations 120 include one or more rounds of corresponding example prompt 122 and example response 124. The test conversations 120 from testing database 114 are designated as "golden" samples. The test conversations 120 serve as benchmarks, references, or models for evaluating the success of LLM fine-tuning to improve ChatBot performance. In one embodiment, unlike sample conversations 116, test conversations 120 have been vetted to establish that performance of the agent in the conversation is satisfactory before inclusion in testing database 114.

In one embodiment, data handler 104 provides an interface or API by which other components or modules may access conversations from training database 102 or testing database 114. For example, data handler 104 is configured to return the conversations to a requesting component, or expose the conversations for retrieval by particular components. Data handler 104 is configured to pass the sample conversations 116 from training database 102 to conversation parser 106. And, data handler 104 is configured to pass the test conversations 120 from testing database 114 to conversation parser 106. In short, data handler 104 is configured to collect conversations and make them available to other components for subsequent processing and use.

In one embodiment, for both sample conversations 116 and test conversations 120, an individual conversation includes one or more rounds of natural language example prompt by a querent (a first of the two entities) and example response by an agent (a second of the two entities). An individual round of conversation between a querent (the user) and an agent (the LLM ChatBot responding to the user) typically follows a structured flow that includes a prompt from the querent and a corresponding response from the agent. The prompt by the querent is an initial part of the conversation round where the querent inputs a query or statement. The prompt may be in the form of a question, request, command, or any other type of expression in natural language. The response by the agent (which corresponds to the prompt) may also be in the form of a question, request, command, or any other type of expression in natural language. Further, for test conversations 120, the response is also a relevant and appropriate reply to the prompt.

In one embodiment, conversation parser 106 is configured to parse the conversations to extract the prompts by the querent and the corresponding responses by the agent for the discrete rounds of the conversation. In one embodiment, conversation parser 106 is configured to parse a sample conversation 116 into corresponding pairs of example prompts 122 and example responses 124. And, in one embodiment, conversation parser 106 is configured to parse a test conversation 120 into corresponding pairs of example prompts 126 and example responses 128.

In one embodiment, conversation parser 106 is configured to collect a sample conversation 116 from data handler 104. Conversation parser 106 is configured to initialize or otherwise set up variables and data structures to store the parsed rounds, such as a list of tuples associated with the conversation where each tuple contains an example prompt 122 and a corresponding example response 124 for a round of the sample conversation 116. Conversation parser 106 is configured to segment the text of the sample conversation 116 into individual lines or blocks based on delimiters like newlines or specific markers indicating a change of writer (or speaker). Conversation parser 106 is configured to identify the role (e.g., querent or agent) of the writer for each segment, and label the segment with the role. The role can be determined based on associating predefined labels (e.g., "User:", "Agent:") in the conversation with the querent and agent, or inferred from context in the sample conversation 116. Conversation parser 106 is configured to pair each example prompt 122 by the querent with the next available example response 124 by the agent to define an individual round of conversation. The paired example prompt 122 and corresponding example response 124 for each round is stored in a tuple or other data structure that holds the pair. The tuples are added to a list or other data structure of parsed rounds, maintaining the order of the sample conversation 116. Conversation parser 106 is configured to export, store for subsequent analysis, or otherwise make available for use (e.g., by LLM fine tuner 108) the resulting list of example prompts 122 and corresponding example responses 124 for the sample conversation 116.

In one embodiment, conversation parser 106 is configured to parse test conversations 120 into pairs of test prompts 126 and test responses 128 for corresponding rounds in a similar manner. And, conversation parser 106 is configured to export, store for subsequent analysis, or otherwise make available for use (e.g., by automatic LLM evaluator 110) the resulting list of test prompts 126 and corresponding test responses 128 for the test conversation 120.

In one embodiment, LLM fine tuner 108 is configured to fine-tune a large language model 132 to generate responses in natural language based on a ChatBot loss evaluator 136. ChatBot loss evaluator 136 evaluates generated responses 138 using a ChatBot loss function. Generated responses 138 are generated by the large language model 132 to the example prompts 122 by the querent. LLM-fine tuner 108 is configured to generate adjustments 140 to weights (and/or other parameters) of large language model 132 based on ChatBot loss evaluator 136. For example, LLM fine-tuner 108 is configured to update, adjust, optimize, further train, or otherwise fine-tune LLM 132 so as to improve performance of LLM 132 at the task of ChatBot response generation, as measured by the ChatBot loss evaluator 136. In other words, LLM fine-tuner 108 is equipped to tailor a configuration of LLM 132 so as to reduce a combined ChatBot loss function, thereby improving the accuracy of generation of ChatBot responses by the LLM 132 from human language prompts.

In one embodiment, LLM fine tuner 108 is configured to generate adjustments 140 that improve ChatBot performance by LLM 132 based on a loss analysis between the example responses 124 to the example prompts 122, and the generated responses 138 to the example prompts 122 for individual sample conversations 116. LLM fine tuner 108 is configured to produce adjustments 140 to large language model 132 so as to optimize (e.g., minimize) ChatBot loss evaluator 136 over the course of an epoch of training.

In one embodiment, LLM fine tuner 108 is configured to generate adjustments 140 to the weights (and/or other parameters) of LLM 132 by backpropagation. LLM fine-tuner 108 is configured to iteratively adjust weights of LLM 132 in response to the values of ChatBot loss evaluator 136 for parsed sample conversations 116. An epoch of training includes analysis of one or more parsed sample conversations 116. The adjustments 140 may thus be a series of updates or changes to weights of nodes of the LLM 132 (or other parameters). LLM fine tuner 108 is configured to apply the adjustments 140 to the LLM 132 to create a re-trained, updated, or otherwise "tuned" LLM 134 at the end of an epoch of training. LLM fine-tuner 108 submits the tuned LLM 134 to automatic LLM evaluator 110 for evaluation of the ability of tuned LLM 134 to operate as a ChatBot.

In one embodiment, ChatBot loss evaluator 136 is configured to penalize (i) dissimilarity of the collective first responses generated by the large language model to the collective example responses by the agent in the sample conversation, (ii) excessive rounds of conversation by the large language model in comparison to the sample conversation, and (iii) round-by-round dissimilarity of the first responses generated by the large language model to corresponding example responses by the agent in the sample conversation. In one embodiment, a module or other component for executing ChatBot loss evaluator 136 includes sub-modules for similarity loss 142, integration loss 144, and step-wise loss 146. These individual loss analyses generate component loss values of the ChatBot loss evaluator 136. ChatBot loss evaluator 136 is configured to combine loss values of similarity loss 142, integration loss 144, and step-wise loss 146 to produce an overall, combined value of ChatBot loss for the LLM-generated responses 138 to the example prompts 122 of the sample conversation 116. In one embodiment, ChatBot loss evaluator 136 is configured to combine values of similarity loss 142, integration loss 144, and step-wise loss 146 in a weighted average to produce a value of ChatBot loss. In one embodiment, the weights assigned to the component loss values is approximately equal, or exactly equal.

In one embodiment, similarity loss 142 is configured to quantify an extent to which the collective generated responses 138 generated by the large language model 132 are dissimilar to or differ from the collective example responses 124 by the agent in the sample conversation 116. The collective generated responses and collective example responses for the whole sample conversation 116 are analyzed for dissimilarity. The term "collective" here indicates the responses are the cumulative responses, as one body of text, for the whole of one sample conversation 116. Thus, in one embodiment, the collective generated responses 138 are a body of text made up of all the individual responses that are generated to all the example prompts 122 of the sample conversation 116. And, the collective example responses 124 are a body of text made up of all the individual example responses 124 to all the example prompts 122 of the sample conversation 116. In one embodiment, similarity loss 142 is configured to (i) write all the generated responses 138 generated from example prompts 122 of a sample conversation 116 into a first data structure, such as a string, and write all the example responses 124 from the sample conversation into a second data structure; (ii) embed the first data structure (of the collective generated responses) into a multi-dimensional vector space of an embedding model, and embed the second data structure (of the collective example responses) into the multi-dimensional vector space of an embedding model; and (iii) determine a cosine distance between the respective embedded vectors for the collective generated responses and collective example responses. The cosine distance between the two vectors for the collective responses may, optionally, be normalized to be between 0 and 1. Then similarity loss 142 is configured to return the (normalized) cosine distance as the value of similarity loss 142. This value of similarity loss 142 indicates an extent to which the collective generated first responses are semantically dissimilar from the collective example responses as bodies of text.

In one embodiment, integration loss 144 is configured to quantify an extent to which rounds of conversation by the large language model are excessive in comparison to the sample conversation. This integration loss 144 component of the ChatBot loss evaluator 136 indicates how rapidly the generated first responses arrive at an expected answer for the example conversation. For example, integration loss 144 is configured to count a number of rounds of example prompt and generated response that are taken before the generated response matches an expected resolution. For example, the expected resolution may be the final example response in the sample conversation 116. Integration loss 144 is configured to compare each generated response 138 in turn with the expected resolution, and tally or count the rounds up to and including the round in which the match is found. In one embodiment, the match may be detected based on values of precision and recall satisfying a threshold that indicates sufficient similarity between the generated response 138 and the expected resolution.

In one embodiment, step-wise loss 146 is configured to quantify an extent to which first responses generated by the large language model are, round-by-round, dissimilar to corresponding example responses by the agent in the sample conversation. As with similarity loss 142 above, step-wise loss 146 measures semantic dissimilarity based on cosine distance. A pair of generated response and example response correspond where they are responses to a same example prompt, or in other words, are in the same round or step of the conversation. In one embodiment, step-wise loss 146 is configured to measure dissimilarity between pairs of generated response 138 and example response 124 for one round based on cosine distance. For example, step-wise loss 146 is configured to, for each pair of corresponding generated response 138 and example response 124, (i) embed both responses into a multi-dimensional vector space of an embedding model, and (ii) determine a cosine distance between the respective embedded vectors for the generated response 138 and example response 124. The cosine distances may, optionally, be normalized to be between 0 and 1. Then, step-wise loss 146 is configured to average the (normalized) cosine distances for all pairs of generated response 138 and example response 124 for the example conversation 116 to produce the value of step-wise loss 146. This step-wise loss 146 component of the ChatBot loss evaluator 136 indicates an extent to which each of the generated first responses are individually semantically dissimilar from their corresponding example responses in individual rounds or steps of the example conversation.

Additional details regarding the foregoing component loss analyses are provided below, for example with reference to combined ChatBot loss function 212 of FIG. 2, and block 315 of FIG. 3. In one embodiment, ChatBot loss evaluator 136 may include as components various other loss analyses (not shown) that are associated with assessing the quality of the ChatBot responses. For example, ChatBot loss evaluator 136 may include (1) a Levenshtein distance loss that is configured to determine a number of single-character edits required to change the generated response(s) 138 into the corresponding example response(s) 124; (2) a BLEU (Bilingual Evaluation Understudy) score loss that is configured to quantify similarity between generated response(s) 138 and the corresponding example response(s) 124 based on n-gram overlap; (3) a round-level appropriateness loss that is configured to quantify how appropriate a generated response is in the context of the preceding round of conversation; and (4) a knowledge loss that is configured to quantify the accuracy of factual information included in generated responses. In one embodiment, the values of all component loss functions of ChatBot loss evaluator 136 may be normalized to a range, such as between 0 and 1 before combination in ChatBot loss evaluator 136.

In one embodiment, automatic LLM evaluator 110 is configured to generate an evaluation score 150 for performance of the tuned large language model 134 as a chatbot. Automatic LLM evaluator 110 is configured to generate the evaluation score 150 based on additional generated responses 152 that are generated by the tuned large language model 134. The additional generated responses 152 are responses to test prompts 126 parsed from a test conversation 120 by conversation parser 106. In other words, automatic LLM evaluator 110 determines a grade for performance (evaluation score 150) of the tuned LLM 134 as a chatbot following application of a weights update 232 (adjustments 140) by evaluating supplemental responses (additional generated responses 152) produced from the golden or model test queries 126.

Automatic LLM evaluator 110 is configured to execute evaluation scorer 160 to obtain one or more evaluation scores. In one embodiment, automatic LLM evaluator 110 is configured to provide additional generated responses 152, test prompts 126, test responses 128, and/or parsed test conversation 120 as inputs to evaluation scorer 160. And, automatic LLM evaluator 110 is configured to execute evaluation scorer 160 on these inputs to produce an evaluation score 150.

In one embodiment, automatic LLM evaluator 110 is configured to execute components of evaluation scorer 160 that contribute distinct information to the overall evaluation score. In particular, automatic LLM evaluator 110 is configured to execute recall scorer 162 to generate a value of recall between test responses 128 from the test conversation 120 and the additional generated responses 152. Automatic LLM evaluator 110 is also configured to execute precision scorer 164 to generate a value of precision between the test responses 128 and the additional generated responses 152. And, automatic LLM evaluator 110 is configured to execute recall scorer 162 to (1) automatically generate a grading prompt to an additional large language model that requests the additional large language model to grade the additional generated responses 152 for a particular criterion, and (2) automatically submit the additional generated responses 152 and the prompt to the additional large language model to cause the additional large language model to generate a criterion score for the particular criterion. Automatic LLM evaluator 110 is configured to combine these component recall, precision, and criterion score values, for example as a weighted average, into the evaluation score 150.

In one embodiment, automatic LLM evaluator is configured to determine evaluation scores for multiple test conversations 120 and average the resulting scores to produce the evaluation score 150. This serves to stabilize the evaluation score 150. In one embodiment, a batch of several, e.g., 10, test conversations are used for testing the tuned LLM 134 at the conclusion of an epoch of training, with the resulting individual scores included in the average for the evaluation score. Larger batches up to the entirety of the testing database may also be appropriate.

In one embodiment, automatic LLM evaluator 110 is configured to provide (or otherwise make available) evaluation score 150 to deployment decider 112 for evaluation against a threshold 154. Additional detail regarding the operation of automatic LLM evaluator 110 is described below, for example with reference to automatic evaluation for ChatBot 235 of FIG. 2 and block 320 of FIG. 3.

In one embodiment, deployment decider 112 is configured to automatically determine to deploy 158 the tuned large language model 134 to a production environment 156 for ChatBot in response to the evaluation score satisfying the threshold 154. Where the value of evaluation score 150 satisfies the threshold 154—that is, the condition(s) of threshold 154 evaluate to “TRUE” given the value of evaluation score 150—deployment decider 112 is configured to automatically deploy 158 tuned large language model 134 to perform ChatBot tasks in a production environment 156. Where the value of evaluation score 150 does not satisfy the threshold 154—that is, the condition(s) of threshold 154 evaluate to “FALSE” given the value of evaluation score 150—deployment decider 112 is configured to not deploy tuned large language model 134 to perform the ChatBot tasks in the production environment. Instead, deployment decider 112 is configured to initiate a further epoch of training to further improve the ChatBot ability of tuned LLM 132. Threshold 154 is thus configured to distinguish between sufficient and insufficient improvement to ChatBot performance for deployment.

In one embodiment, where higher values of the evaluation score 150 (e.g., a higher ratio of successful unit tests) represent better performance of an LLM at ChatBot interactions, threshold 154 is a minimum value that is satisfied when exceeded by the evaluation score. (In another, alternative embodiment, where lower values of the evaluation score represent better performance of an LLM at ChatBot threshold 154 is a maximum value that is satisfied when evaluation score 150 falls short of the maximum value.) Additional conditions may also be included in threshold 154.

In one embodiment, deployment decider 112 is configured to automatically determine whether to deploy 158 the tuned large language model 134 as a ChatBot in response to the evaluation score 150 satisfying a threshold 154. In one embodiment, where a relatively lower evaluation score 150 indicates better performance than a relatively higher evaluation score 150, the threshold 154 may be set at a previous maximum (highest or best) evaluation score 150 previously achieved by the LLM before fine-tuning. The threshold 154 is satisfied where an evaluation score 150 higher than the previous maximum evaluation score is achieved. This indicates an improvement in ChatBot ability over a previous best. Thus, deployment decider 112 is configured to deploy 158 tuned LLM 134 to the production environment 156 as a ChatBot when the tuned LLM 134 has improved. In this manner, deployment decider 112 is configured to determine whether the tuned LLM 134 is sufficiently fine-tuned for deployment.

In one embodiment, where threshold 154 is satisfied, deployment decider 112 is configured to automatically generate a signal that is determinative as to whether to deploy 158 the tuned LLM 134 to production environment 156, or to initiate further rounds of training for the tuned LLM 134. For instance, deployment decider 112 is configured to automatically generate a trigger signal that indicates that fine tuning of the tuned LLM 134 is complete or otherwise satisfactory. In one embodiment, upon receipt of the trigger signal, ChatBot tuning system 100 initiates automated deployment of the tuned LLM 134 to the production environment 156. And, where threshold 154 is not satisfied, deployment decider 112 may automatically generate a retune signal that indicates that fine tuning of the tuned LLM 134 is not yet complete or is otherwise unsatisfactory. Further training of the tuned LLM 134 by LLM fine-tuner 108 may be initiated in response to receipt of the retune signal.

In one embodiment, deployment decider 112 is configured to initiate automated deployment of the tuned LLM 134 to a production environment in response to receipt of the trigger signal. In one embodiment, deployment decider 112 is configured to automatically deploy 158 the tuned LLM 134 by accepting or selecting the tuned LLM 134 for promotion to operation in the live or production environment 156. And, in one embodiment, deployment decider 112 is further configured to automatically carry out the promotion of the tuned LLM 134 to the production environment 156. For example, the deployment decider 112 is configured to integrate the tuned LLM 134 into the production environment 156 by automatically updating the model serving infrastructure, application programming interfaces (APIs), and/or other components used for operating the LLM as a ChatBot to respond to chat-style prompts.

The automated deployment process rolls the tuned LLM 134 out to production environment 156 to replace or supersede a prior LLM as a ChatBot. As examples, the prior LLM may be an earlier training iteration or version of tuned LLM 134 (for example, LLM 132), or an alternative LLM configured as a ChatBot that has a training history that differs from or is discrete from that of tuned LLM 134 or LLM 132. In one embodiment, deployment decider 112 is configured to automatically execute steps to replace the prior LLM in the production environment 156 with the tuned LLM 134. In one embodiment, the steps for automated deployment are performed by another component or module of ChatBot tuning system 100 in response to direction by the deployment decider 112 (for example, in response to the trigger signal). The automated deployment of the tuned LLM 134 minimizes disruption to the production environment 156 while incorporating the improved ChatBot ability of tuned LLM 134. In one embodiment, deployment decider 112 is configured to automate deployment of the tuned LLM 134 by a process of administrator confirmation (optional), model serialization, and API integration.

As an optional initial step, an administrator is presented with a choice to confirm or reject the automated deployment of tuned LLM 134 into the production environment 156. For example, the choice may be presented as a user-selectable option (such as a button) in a graphical user interface (GUI) to ChatBot tuning system 100. As another option, the administrator may also be presented in the GUI with a choice to schedule the automated deployment of tuned LLM 134 into the production environment 156 at a selected time. Where the administrator schedules the deployment, the automated deployment is carried out at the selected time.

In one embodiment, for the automated deployment, deployment decider 112 proceeds to serialize the tuned LLM 134. Prior to serialization, tuned LLM 134 is represented as an object, such as a Python object. Deployment decider 112 encapsulates the architecture, learned weights for improved ChatBot performance, and other parameters of the tuned LLM 134 into a serialized format for storage as a data structure. For example, deployment decider 112 accesses and executes a serialization function (such as ‘dump( )’ in the ‘joblib’ library for the scikit-learn ecosystem) on the tuned LLM 134. Similar serialization functions are available in other machine learning ecosystems. The serialized, tuned LLM 134 may be loaded into memory or otherwise accessed from the serialized data structure. The serialized, tuned LLM 134 is written to a specified storage location accessible by the production environment 156.

In one embodiment, deployment decider 112 then integrates the serialized, tuned LLM 134 into an existing API infrastructure for the production environment 156. Deployment decider updates the existing API endpoints and functionality to accommodate the tuned LLM 134. In one embodiment, discrete endpoints are defined to support various natural language processing tasks or functionalities. In one embodiment, there is a ChatBot endpoint dedicated to ChatBot tasks. The ChatBot endpoint accepts parameters such as prompts for generation of a chat-style response. For example, the endpoint path may be '/chat_bot'.

Deployment decider 112 updates code for the ChatBot endpoint in the production environment 156. The updates change the code for the software ChatBot endpoint to load the serialized, tuned LLM 134, rather than the serialized prior LLM. For example, the code for the ChatBot endpoint is modified to (i) initialize the serialized, tuned LLM 134 (rather than initializing the prior LLM) from the specified storage location, and (2) direct incoming ChatBot requests to be handled by the initialized, tuned LLM 134 (rather than directing tasks to the prior LLM). Access to the prior LLM through the ChatBot endpoint is discontinued by removal of code to initialize or direct requests to the prior LLM, and the serialized prior LLM may be removed from the production environment 156. In one embodiment, the changes to the code of the ChatBot endpoint are managed by a version control system to allow for consistent deployment to the production environment, and allow for roll-back of the changes. In this way, the tuned LLM 134 that has been fine tuned to improve behavior as a ChatBot may be automatically rolled out to the production environment 156.

Further details regarding ChatBot tuning system 100 are presented herein. In one embodiment, the operation of ChatBot tuning system 100 to fine tune the LLM for a ChatBot task will be described with reference to ChatBot tuning pipeline 200 shown in FIG. 2 and example ChatBot tuning method 300 shown in FIG. 3.

LLM Fine-Tuning for ChatBots

As discussed above, an LLM may be configured to perform as a ChatBot. Given multiple rounds of natural language description for some certain questions/instructions, an LLM-based ChatBot generates responses based on the conversational agents designed to interact with users using natural language.

Chat capability of an LLM may be enhanced by evaluating the ability of the LLM to produce natural language responses to conversational prompts. In one embodiment, a ChatBot tuning system (such as ChatBot tuning system 100) implements a process or pipeline to fine-tune an LLM for the ChatBot task. The ChatBot tuning system is configured to automatically improve responses generated by an LLM-based ChatBot. To improve the ChatBot ability of the LLM, customized ChatBot conversation data and a training loss function that are specific to ChatBot functionality are used to further fine tune the LLM. In one embodiment, the training loss function penalizes responses that (i) differ semantically from test responses, (ii) are not concise, and/or (iii) are incorrect.

Conversation data may be captured from customer interactions with human chat agents or customer interactions with chat bots. For example, customers for different kinds of products/services often ask questions about those products/services. Many of the customer questions are handled by autonomous chat agents, especially where the questions are asked online. Conversation data including human customer service agent and/or chat agent response based on user questions may be collected. An example of conversation data for chat questions and responses is given in Table 1 below:

TABLE 1

| Example Description | Example Input/Output |
| --- | --- |
| A chatbot scenario between a human customer and a service chatbot | Customer:<br>"Coffee maker has issues"<br>ChatBot:<br>"What type of issue are you experiencing? Hi there! If you are having trouble with your coffee maker, please select the type of issue you are experiencing. This will help us to provide you with the best possible support: ["Leakage", "Plugged", "Overheating", "On/off switch", "Water level"]"<br>Customer:<br>"Leakage"<br>ChatBot:<br>"Check if the water tube has physical damage or if the sealing ring has a leakage issue." |

In one embodiment, at a high level, the ChatBot tuning system implements a pipeline to fine-tune an LLM for the ChatBot task. Unlike traditional techniques which use prompt engineering or in-context learning to improve ChatBot conversation ability of an LLM, the ChatBot tuning system improves the conversation ability based on previously completed chats. For example, the ChatBot tuning system first collects multi-round ChatBot conversation data. The conversation data is used to fine-tune the LLM's weights in a training process. The loss functions applied during fine-tuning are a novel design (described in further detail below) that encourage the ChatBot responses to (i) interact with users using human-like natural language and (ii) be related to the human questions/instructions. A specifically designed ChatBot conversation evaluation dataset is then used to quantify the LLM's performance as a ChatBot and helps to iteratively improve the LLM fine-tuning outcome.

Figure 2:
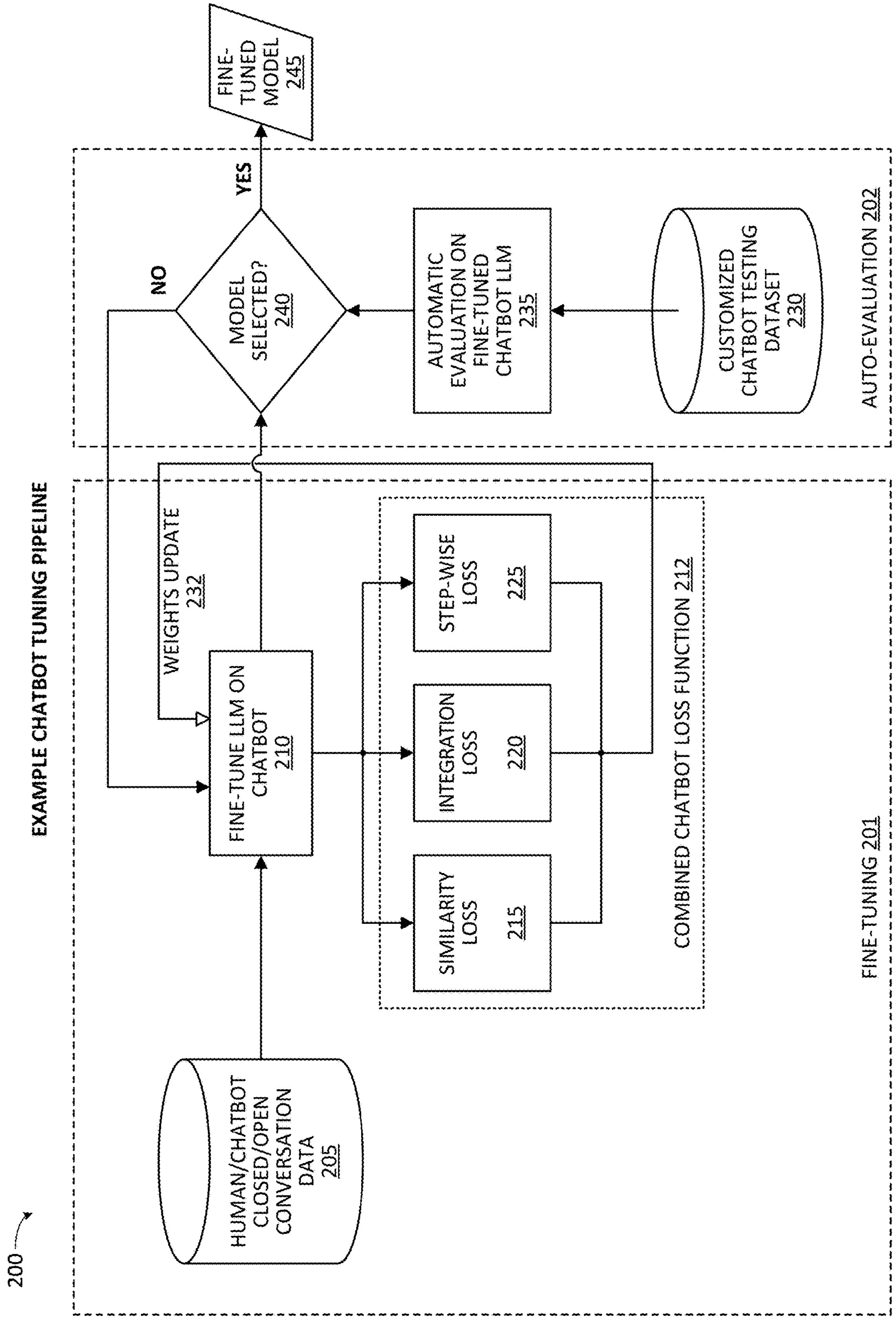
FIG. 2 illustrates an example ChatBot tuning pipeline for automated fine-tuning of LLM-based ChatBot conversation.

FIG. 2 illustrates an example ChatBot tuning pipeline 200 for automated fine-tuning of LLM-based ChatBot conversation. FIG. 2 provides a general overview of fine-tuning of an LLM ChatBot. In one embodiment, there are two main parts or phases in ChatBot tuning pipeline 200: fine-tuning 201 and auto-evaluation 202. In one embodiment, ChatBot data (that is, conversation data 205) such as human-ChatBot conversation specifically targets different industries, service, and products to fine-tune ChatBot conversation ability of the LLM with a training process. The fine-tuning 201 implements a training process that uses a novel loss function design (described in further detail elsewhere herein). Then, in the auto-evaluation 202, the fine-tuned model is processed by an automatic evaluation pipeline that is specifically configured for evaluating LLM ChatBot performance. If the fine-tuned model satisfies designated selection metrics, the fine-tuned model will be selected to output. If not, the pipeline will trace back to the fine-tuning stage and keep fine-tuning the LLM on the ChatBot task to get a more fine-tuned (better) LLM model.

In one embodiment, the fine-tuning 201 part of ChatBot tuning pipeline 200 includes conversation data 205, fine-tuning for ChatBot 210, and a combined chatbot loss function 212 that incorporates the similarity loss function 215, integration loss function 220, and stepwise loss function 225. And, the auto-evaluation 202 part of ChatBot tuning pipeline 200 includes a testing dataset for ChatBot 230, automatic evaluation for ChatBot 235, and a model selection 240. In one embodiment, ChatBot tuning pipeline 200 produces a fine-tuned model for ChatBot 245 as output.

In one embodiment, conversation data 205 includes a database of interactions between a user and a ChatBot (or, alternatively, a human). For example, conversation data 205 includes text records of conversations between a human and ChatBot, such as the example Input/Output shown in Table 1 above. In conversation data 205, the conversations include rounds of conversation in which the responses produced by the ChatBot are human-like. Individual rounds of conversation include a text prompt in human language, and a response in human language. In one embodiment, the responses are considered to be "ground truth" or otherwise acceptable responses to the preceding text prompts. Conversation data 205 is used to train the LLM to mimic a human response in conversation. In one embodiment, the conversation data 205 includes open conversations. Open conversations cover a plurality of rounds of interaction between the user and the ChatBot. In one embodiment, the conversation data 205 includes closed conversations. Closed conversations generally span about one to three rounds. The distinction here between open and closed conversations is approximate.

In one embodiment, fine-tuning for ChatBot 210 is configured to train an LLM so as to adjust performance of the LLM at a task of providing conversational, accurate, and contextually appropriate responses to user prompts. For example, fine-tuning for ChatBot 210 is configured to execute a training process based on a novel combined chatbot loss function 212 made-up of similarity loss function 215, integration loss function 220, and stepwise loss function 225. Weights of the LLM are adjusted iteratively to minimize the combined chatbot loss function 212. The component loss functions quantify various ways in which output from the LLM differs from "ground truth" output in the conversation data 205.

In one embodiment, fine tuning for chatbot 210 trains the LLM to mimic human conversation or chat responses through one or more epochs of sample conversations. During the training, weights of the LLM are adjusted iteratively (e.g., by backpropagation) to minimize the combined chatbot loss function 212. At the conclusion of a training epoch, the trained LLM will be evaluated for improved performance, for example as discussed for the auto-evaluation phase 202 below.

In one embodiment, similarity loss function 215 measures how close the LLM output is to the ground truth output in the conversation data 205. In other words, similarity loss function 215 measures how similar or dissimilar the collective LLM responses are to the collective human-like responses in an example conversation. More particularly, similarity loss function measures semantic divergence by the LLM-generated responses from the example, "ground truth" responses in the conversation data 205. To measure the closeness (i.e., semantic divergence or alignment), the ChatBot tuning system 100 determines a distance between the generated responses and example responses in a vector space.

In one embodiment, ChatBot tuning system 100 preprocesses the conversation data 205 to separate the example prompts from the example responses in an example conversation. For example, ChatBot tuning system 100 may parse the contents of an example conversation to identify the example prompts, and to identify the example responses. ChatBot tuning system 100 extracts as example prompts those portions of the example conversation that are labeled as being produced by a person (for example, by the label "Customer", as shown in Table 1). And, ChatBot tuning system 100 extracts as example (ground truth) responses those portions of the example conversation that are labeled as being produced by a ChatBot (for example, by the label "ChatBot", as shown in Table 1). The example prompts are provided to the LLM to generate responses by the LLM.

For analysis by similarity loss function 215, the individual example responses are gathered together, for example by writing all the example responses into a first data structure (such as a list, array, or string). And, the individual generated responses are gathered together, for example by writing all the generated responses into a second data structure (such as a list, array, or string). These data structures that represent the collective example responses and collective generated responses for a conversation may be processed by similarity loss function 215.

Similarity loss function 215 then embeds the model-generated responses (from the first data structure) and the example (ground truth) responses (from the second data structure) into the vector space. Similarity loss function 215 embeds the generated responses into a first vector, and embeds the example responses into a second vector. In one embodiment, the generated responses and example responses are embedded at the word level. For example, similarity loss function 215 converts the words from the response data structures into individual dense vectors per word. The respective word vectors for the generated responses and example responses may then be merged by vector arithmetic to capture single-vector semantic vector representations for both the generated responses and example responses. In particular, the word vectors for the individual words of the generated responses may be merged by vector arithmetic to produce a semantic vector representation of the generated responses. And, the word vectors for the individual words of the example responses may be merged by vector arithmetic to produce a semantic vector representation of the example responses. Both the generated responses and the example responses are thus mapped into a vector space.

Similarity loss function 215 then generates a similarity metric that quantifies the difference between alignments of the generated responses and example responses in the vector space. For example, similarity loss function 215 may calculate, as the similarity metric, the cosine distance between the two vectors for the generated responses and example responses. Thus, in one embodiment, the cosine distance is used as the measure of similarity loss. Where the cosine distance is closer to 1, the generated responses and example responses for a conversation are semantically similar. And, vice versa, where the cosine distance is close to 0, the generated responses and example responses are semantically quite different. Thus, in one embodiment, similarity loss function 215 compares the generated responses to the example responses so as to measure the semantic divergence between the generated responses given by the LLM that is being fine-tuned and the example responses that are recorded in the example conversation.

In one embodiment, other measures of similarity may be used for comparison of the generated responses with the example responses. For example, the cosine of the angle between the two vectors may be used, and ranges from −1 (completely dissimilar) to 1 (identical). (Note, the cosine distance (discussed above) is the complement of the cosine of the angle between the two vectors.) Or for example, the Euclidean distance (straight-line distance) in the vector space between the endpoints of the two vectors may be used, and ranges from 0 (identical) to infinity (completely dissimilar).

In one embodiment, integration loss function 220 measures how "tight" the generated responses made by the LLM is. In other words, integration loss function 220 indicates or measures the brevity of the response by the LLM in comparison with the ground truth output in the conversation data 205. Where the LLM resolves the user inquiry in few rounds, integration loss is low. Where the LLM takes multiple unnecessary rounds to resolve the user inquiry, integration loss will be high. In one embodiment, integration loss function 220 compares counts of rounds taken to resolve the question and/or get to an expected answer by the LLM and the ground truth output. In one embodiment, the difference between the counts of rounds is taken as the measure of integration loss. In one embodiment, this difference is normalized to the range between zero and one.

In one embodiment, integration loss function 220 parses the example conversation to determine (1) a tally or count of rounds in the example conversation, and (2) an example response in a final round of the example conversation to be used as the expected answer. In one embodiment, integration loss function 220 provides the same prompts as used in the example conversation to the LLM, and records the number of rounds of the taken by the LLM to generate a response that matches (or is sufficiently similar to) the expected answer. In one embodiment, whether the generated response in a given round matches the expected answer is determined based on measures of recall and/or precision between the generated response and the expected answer. Where the measures of recall and/or precision satisfy a pre-set threshold, the response is considered to match the expected answer. Integration loss function 220 then compares the counts of rounds for the example and generated conversations, and determines the difference in the number of rounds. The difference may be normalized to a range between 0 and 1, for example by dividing the difference by the total number of rounds in the example conversation. Integration loss function 220 then returns the normalized difference as the integration loss value. Here, a lower integration loss value indicates fewer unnecessary rounds, and a more concise resolution by the LLM.

In one embodiment, step-wise loss function 225 measures an extent to which a response made by the LLM is partially correct. For each round made by the LLM, the chatbot tuning system compares the LLM's response to the ground truth responses in the one or more rounds of the ground truth interaction in the conversation data 205. As discussed above with reference to similarity loss function 215, the difference between the LLM and the ground truth responses are measured by the cosine distance between vector embeddings of the individual responses. A pair of example and generated response is selected for each round of conversation. In one embodiment, a cosine distance is determined for each pairing of responses. In one embodiment, the cosine distances are averaged over the one or more rounds of conversation to produce the measure of the stepwise loss. Stepwise loss function is thus complementary to the similarity loss function 215 and the integration loss function 220, evaluating response similarity as distributed across rounds.

In one embodiment, the similarity loss, integration loss, and stepwise loss values are averaged to produce a combined loss value for combined ChatBot loss function 212. This combined loss value is returned to fine tuning for ChatBot 210. ChatBot tuning system 100 then updates the weights of the LLM based on the combined loss value (weights update 232). In one embodiment, ChatBot tuning system loads a batch of conversation data 205, and repeats the LLM output prediction (i.e., response generation), combined loss function analysis of combined ChatBot loss function 212, and weight updates 232 for the plurality of conversations in the batch. This may be referred to as a training epoch. The length of the batch/epoch may vary. In one embodiment, the LLM is fine-tuned based on several thousand conversations per epoch, for example, a batch of 10,000 conversations.

Upon completion of an epoch, ChatBot tuning system 100 proceeds to an auto-evaluation phase 202 and determines whether or not to select the fine-tuned model for output, as discussed below with respect to model selection for chatbot 240. During the auto evaluation phase 202, the weights of the LLM are fixed, and are no longer being updated. During the auto evaluation phase 202, ChatBot tuning system 100 accesses customized testing dataset for ChatBot 230 to retrieve test conversations, executes the tuned LLM to produce responses to the inputs or prompts in the conversations, and then evaluates how well the LLM performs in the ChatBot use case.

In one embodiment, testing dataset for ChatBot 230 is a collection of conversations between humans and ChatBots, similar to that of conversation data 205. In one embodiment, the conversations in testing data set for chatbot 230 are discrete from and do not overlap the conversations in conversation data 205, thereby preventing overfitting. In one embodiment, testing data set for chatbot 230 includes a few hundred to a few thousand conversations. For example, testing data set for chatbot 230 includes approximately 1000 conversations. In one embodiment, testing data set for chatbot 230 is a golden dataset for ChatBot performance testing, as discussed below with reference to FIG. 7. The conversations in the testing dataset for chatbot 230 may be referred to herein as reference conversations.

In one embodiment, automatic evaluation for ChatBot 235 quantifies how well the LLM performs as a ChatBot, based on comparisons between LLM-generated outputs and ground truth outputs for conversations in testing data set for chatbot 230. In one embodiment, chatbot tuning system evaluates language similarity between the generated and ground truth outputs. In one embodiment, the similarity is evaluated based on recall and/or precision between the generated and ground truth outputs. In one embodiment, the scores for recall and precision are normalized to the range from 0 to 1. In one embodiment, the scores are averaged.

As discussed above, "recall" refers to an extent to which words or phrases in the generated output also occur in the ground truth output. Here, recall indicates a proportion of relevant items in the example response that were also identified in the generated response. Also, as discussed above, in one embodiment, "precision" refers to an extent to which words appear in the same order in both the generated and ground truth outputs. Here, precision indicates a proportion of items in the generated response that are relevant to the reference response.

In one embodiment, as part of automatic evaluation for chatbot 235, chatbot tuning system 100 further grades the model with respect to whether the LLM satisfies additional criteria. In one embodiment, the grading is based on an additional LLM use. In particular, chatbot tuning system prompts or asks an LLM to score the generated output for satisfaction of one or more criteria. For example, chatbot tuning system 100 retrieves a pre-composed prompt regarding a criterion, and submits the prompt, the generated output, and (in some cases) the ground truth output or other information to the LLM to cause the LLM to produce a score for the criterion. This prompt may be referred to as a "grading prompt". The chatbot tuning system 100 stores the score for the criterion that was produced by the LLM. The scores produced by the LLM may be normalized to the range from 0 to 1 (where the scores produced by the LLM are not already normalized to the range from 0 to 1). The scores produced for the criteria by the LLM may be averaged to produce a model grade that is a grade or score of the tuned model.

For example, the chatbot tuning system 100 may submit various grading prompts and related information such as the example prompts and LLM generated responses to an LLM that is configured to grade the related information. For example, the chatbot tuning system 100 may prompt the LLM to score the generated output on the criterion of repetitiveness with a prompt such as: "Grade, on a scale from 0 to 100%, are the generated responses non-repetitive?" Or, for example, the chatbot tuning system 100 may prompt the LLM to score the generated output for human readability with a prompt such as, "Measure how human-readable the generated responses are on a scale from 0 to 1." In another example, the chatbot tuning system 100 may prompt the LLM to score for relevance with a prompt such as, "On a scale from 0 to 1, how relevant are the generated responses to the initial prompts?" In another example, yes/no criteria may also be evaluated by the LLM. For example, the chatbot tuning system 100 may prompt the LLM to determine "Are the generated responses human-readable? Respond 1 for yes and 0 for no."

In one embodiment, the grading prompts are submitted to an LLM other than the tuned LLM that is under test or evaluation at auto-evaluation stage 202. In one embodiment, the grading prompts are submitted to an LLM that is under test. Thus, the LLM that is under test may be graded by an LLM on a wide variety of criteria. A non-exhaustive list of grading criteria includes whether, or to what extent the generated output (e.g., a generated response):

- is repetitive;
- is human-readable;
- is in a particular narrative perspective (a chatbot should answer in the first person, etc.);
- corresponds to a requested format, such as numbered list, number of paragraphs, iambic pentameter, .txt file, JSON, or any of a wide variety of format constraints;
- complies with a specified output length (e.g., word count);
- is relevant to the prompt(s) preceding the generated output; and
- is concise.

In one embodiment, the grading prompts are data-specific. And, in one embodiment, the grading prompts may be pre-composed, and stored in association with test conversations for which they are relevant. For example, pre-composed prompts for generating criteria scores may be pre-included with test conversations in testing dataset for ChatBot 230. The grading prompts for criteria scoring may be designed specifically to suit data in the associated test conversation.

In one embodiment, various weights may be applied to the criteria scores to emphasize or de-emphasize a given criteria. In one embodiment, the output of the model grading is an average of the normalized criteria scores. For example, the criteria scores are normalized to the range of 0-1 before averaging. This produces a single model grade score in the range of 0-1.

In one embodiment, automatic evaluation for ChatBot 235 produces a tuple of the recall score, the precision score, and the model grade score as output. In one embodiment, the recall score, the precision score, and the model grade score may be weighted to emphasize or de-emphasize a score. In one embodiment, the recall score, the precision score, and the model grade score may be averaged into one overall evaluation score. These scores may be averaged over the set of test conversations with which the tuned LLM is evaluated.

In one embodiment, model selection for ChatBot 240 determines whether the LLM is sufficiently improved with regard to the ChatBot task to warrant promotion to a fine-tuned model for ChatBot 245 as output or not. In one embodiment, promotion indicates that the fine-tuned model for ChatBot 245 will be placed in a production environment to respond to ChatBot interactions. If not, then ChatBot tuning pipeline 200 returns to fine-tuning on ChatBot 210 for a further training epoch using a new batch of conversations drawn from conversation data 205. In one embodiment, the threshold for selecting a LLM to be a fine-tuned model for ChatBot 245 as output is whether the current overall evaluation score exceeds a previous high overall evaluation score. In one embodiment, the threshold for selecting a LLM to be a fine-tuned model for ChatBot 245 as output is whether the current recall score, the current precision score, and the current model grade score exceed previous highs for recall score, precision score, and model grade score.

Example ChatBot Tuning Method

Figure 3:
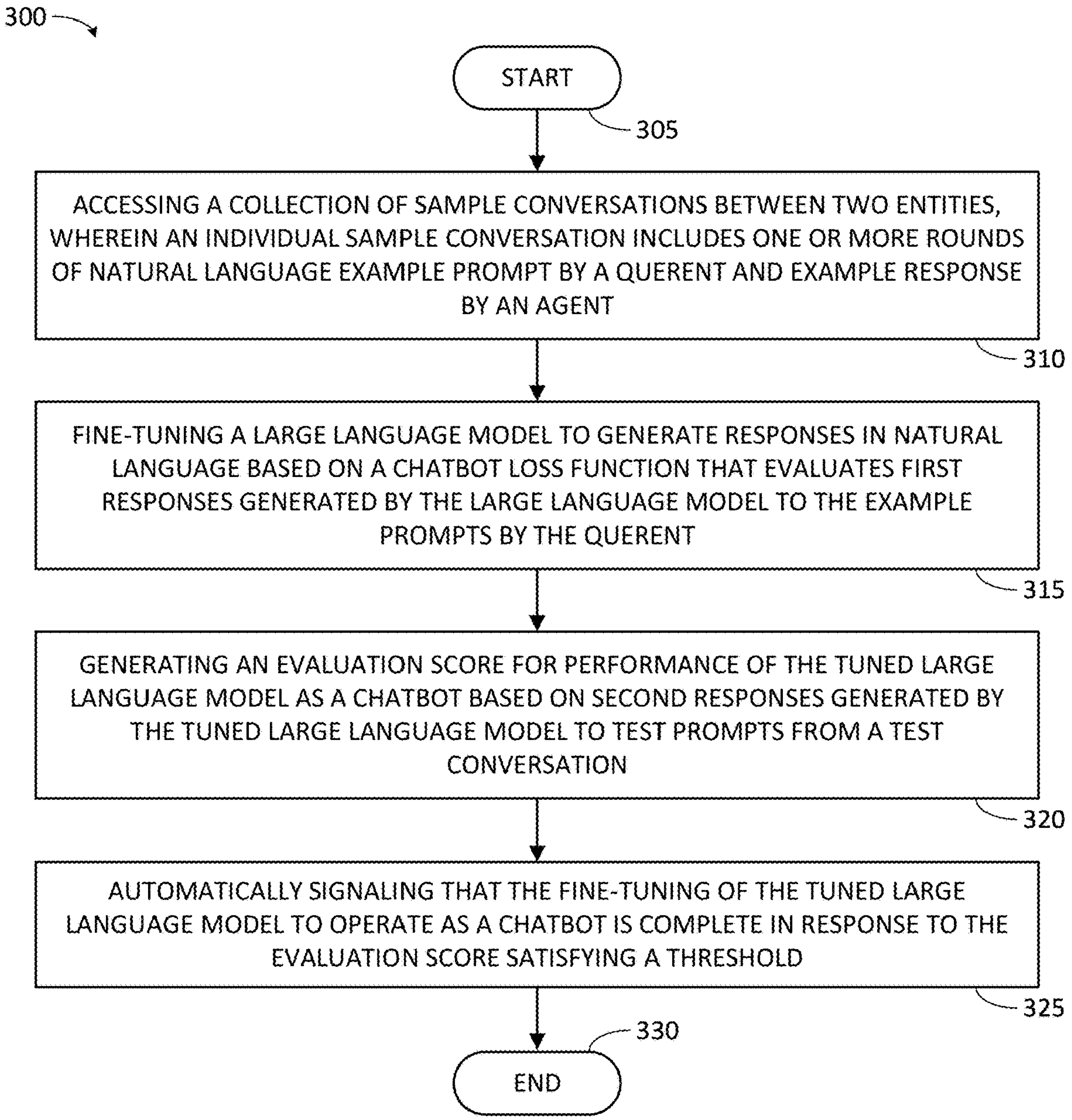
FIG. 3 illustrates one embodiment of a ChatBot tuning method associated with automated LLM fine-tuning for ChatBots.

FIG. 3 illustrates one embodiment of a ChatBot tuning method 300 associated with automated LLM fine-tuning for ChatBot performance. In one embodiment, ChatBot tuning method 300 is a technique to fine-tune an LLM in order to improve an ability of the LLM to operate as a ChatBot based on a collection of sample conversations between a querent (such as a customer) and an agent (such as ChatBot, human service representative, or other respondent). In one embodiment, ChatBot tuning method 300 may implement an automatic evaluation pipeline that fine-tunes an LLM and then analyzes the behavior of the fine-tuned LLM as a ChatBot to determine if ChatBot performance is improved, such as ChatBot tuning pipeline 200 shown and described above with reference to FIG. 2. In one embodiment, the analysis is automatic, and based on an automated generation of an evaluation score (such as shown and described with reference to automatic LLM evaluator 110 and automatic evaluation for ChatBot 235), thereby fully automating evaluation of ChatBot performance by the tuned LLM.

In one embodiment, as a general overview, ChatBot tuning method 300 accesses a collection of sample conversations between pairs of entities: a querent (such as a customer) that provides a human language prompt, and an agent (such as a ChatBot) that provides a human language response to the prompt. Using the sample conversations, ChatBot tuning method 300 fine-tunes a large language model to improve performance of the large language model as a natural language ChatBot. The fine-tuning is supplemental training of the large language model based on a ChatBot loss function. The ChatBot loss function evaluates responses generated by the large language model to the example prompts by the querent from the sample conversations. Once an epoch of the fine-tuning has been completed, ChatBot tuning method 300 generates an evaluation score for performance of the tuned large language model as a ChatBot. The evaluation score is based on responses generated by the tuned large language model to test prompts from a test conversation. ChatBot tuning method 300 then determines whether the evaluation score satisfies a threshold for improvement. Where the threshold is satisfied, ChatBot tuning method 300 automatically signals that the fine-tuning of the tuned large language model to operate as a chatbot is complete. This signal may trigger ChatBot tuning method 300 to automatically deploy the tuned large language model to a production environment to operate as a chatbot.

In one embodiment, ChatBot tuning method 300 initiates at START block 305 in response to a ChatBot tuning system (such as ChatBot tuning system 100) determining that (i) an LLM has been submitted to the ChatBot tuning system to have its performance as a ChatBot fine-tuned; (ii) an instruction to perform the ChatBot tuning method 300 has been received by the ChatBot tuning system; (iii) a retune signal has been received indicating that an LLM being fine-tuned has not yet satisfied a threshold for ChatBot performance; (iv) it is currently a time at which the ChatBot tuning method 300 is scheduled to be run; or (iv) that ChatBot tuning method 300 should commence in response to some other condition. In one embodiment, a computer system configured by computer-executable instructions to execute functions of ChatBot tuning system 100 and/or ChatBot tuning pipeline 200 executes the ChatBot tuning method 300. Following initiation at START block 305, ChatBot tuning method 300 continues to block 310.

At block 310, ChatBot tuning method 300 accesses a collection of sample conversations 116 between two entities. An individual sample conversation includes one or more rounds of natural language example prompt by a querent and example response by an agent. In other words, ChatBot tuning method 300 accesses the training database 102 of human/chatbot closed/open conversation data 205, in which the sample conversations 116 include multiple cycles of prompt and response by the user and ChatBot, respectively.

In one embodiment, to access the collection of sample conversations 116, ChatBot tuning method 300 (i) initializes a data handler component (such as data handler 104); (ii) establishes a connection to a training database (such as training database 102); (iii) retrieves a sufficient quantity of sample conversations (such as sample conversations 116) from the training database to be used for an epoch of training; and (iv) provides the sample conversations to a conversation parser component (such as conversation parser 106) for extraction of the various components of the conversation, including corresponding pairs of example prompt and example response for each round of the conversation. In one embodiment, the quantity of sample conversations for the epoch of training are organized as a batch, for example by being placed into a data structure or array for subsequent processing. In this manner, the collection of sample conversations is accessed and the sample conversations are configured for subsequent operations to fine-tune the LLM.

In one embodiment, the steps of block 310 are performed by data handler 104. At the conclusion of block 310, ChatBot tuning method 300 has accessed, retrieved, or otherwise made available sample conversations 116 for fine-tuning the LLM. Processing continues to block 315.

At block 315, ChatBot tuning method 300 fine-tunes a large language model to generate responses in natural language based on a ChatBot loss function (such as combined chatbot loss function 212). The ChatBot loss function evaluates first responses generated by the large language model to the example prompts by the querent. ChatBot tuning method 300 determines a value of ChatBot loss by analyzing relationships between example responses 124 to example prompts 122 of the sample conversations 116 and generated responses 138 to the example prompts in various ways. ChatBot tuning method 300 then generates and applies adjustments (e.g., adjustments 140) to the weights of the LLM to improve the ChatBot loss.

In one embodiment, the value of ChatBot loss combines several distinct analyses, such as similarity loss 142, 215, integration loss 144, 220, and step-wise loss 146, 226. In one embodiment, similarity loss evaluates how well a vector embedding of all the example responses for the sample conversation match an embedding of all the generated responses for the sample conversation, based on the magnitude of cosine distance between the two embeddings. In one embodiment, integration loss evaluates how many rounds of conversation elapse until the generated response matches an expected resolution of the sample conversation 116, based on recall and precision between the generated responses (to each example prompt) and the final example response in the sample conversation 116. In one embodiment, step-wise loss evaluates how well a vector embedding of generated response matches the embedding of the corresponding example response at each step of the sample conversation, based on magnitude of cosine distance between the paired embeddings for each round. These analyses may be normalized to a shared range, and combined for example as a weighted average, to produce an overall value of ChatBot loss.

In one embodiment, ChatBot tuning method 300 initializes an LLM fine-tuner component (such as LLM fine tuner 108) to perform the steps of block 315. In one embodiment, to fine-tune the ChatBot capabilities of a large language model, ChatBot tuning method 300 (i) accesses example prompts 122 and example responses 124, extracted from sample conversation 116 by conversation parser 106; (ii) executes LLM 132 on the example prompts 122 to produce generated responses 138 (to the example prompts 122); (iii) submits generated responses 138 and example responses 124 to ChatBot loss evaluator 136; (iv) executes combined ChatBot loss function 212 to produce a value of ChatBot loss for the LLM 132 with respect to the sample conversation 116; (v) determine adjustments 140 to weights of the LLM 132, for example by backpropagation of the gradient of the loss function through layers of the LLM 132; (vi) apply the adjustments 140 to the weights of the LLM 132 to generate the tuned LLM 134. In one embodiment, the fine-tuning process is repeated for a plurality of sample conversations, for example through an epoch of fine-tuning.

In one embodiment, the steps of block 315 are performed by LLM fine-tuner 108. At the conclusion of block 315, ChatBot tuning method 300 has taken one or more sample conversations 116 and used them to improve the performance of a large language model as a ChatBot. Processing continues to block 320.

At block 320, ChatBot tuning method 300 generates an evaluation score (e.g., evaluation score 150) for performance of the tuned large language model (e.g., tuned LLM

134) as a ChatBot. The evaluation score is generated based on second responses generated by the tuned large language model to test prompts from a test conversation. In one embodiment, ChatBot tuning method 300 executes tuned LLM 134 on test prompts 126 from test conversation 120 to generate additional generated responses 152 for testing the tuned LLM 134. Then, ChatBot tuning method 300 executes evaluation scorer 160 on the additional generated responses 152 to produce the evaluation score 150.

In one embodiment, ChatBot tuning method 300 initializes an automatic LLM evaluator (such as automatic LLM evaluator 110) to perform the steps of block 320. In one embodiment, ChatBot tuning method 300 (i) retrieves or otherwise accesses test prompts 126 and corresponding test responses 128 parsed from a test conversation 120; (ii) executes the tuned LLM 134 on the test prompts 126 to create additional generated responses 152 for use in testing the ChatBot performance of tuned LLM 134; (iii) submits the additional generated responses 152, test prompts 126, and test responses 128 to evaluation scorer 160; (iv) executes the evaluation scorer 160 on the test prompts 126, and corresponding test responses 128 and additional generated responses 152 to produce the evaluation score.

In one embodiment, ChatBot tuning method 300 executes one or more component scoring functions of the evaluation scorer 160 in order to produce an overall evaluation score. For example, ChatBot tuning method 300 initializes, executes, and stores the resulting scores of a recall scorer 162, a precision scorer 164, and an LLM criteria scorer 166. ChatBot tuning method 300 may then normalize resulting component scores for recall, precision, and one or more criteria to range between 0 and 1. ChatBot tuning method 300 may then combine the normalized component scores for recall, precision, and one or more criteria—for example in a weighted average—to generate evaluation score 150.

In one embodiment, recall scorer 162 generates a recall score for one or more of the corresponding pairs of test responses 128 and additional generated responses 152 by tokenizing both responses, identifying unique tokens, finding common tokens between the responses, and dividing the number of common tokens by the total unique tokens in the test response 128 to produce the recall score. The recall score quantifies the extent to which the generation by the tuned LLM 134 includes relevant content by indicating the proportion of the test response 128 that also occurs in the additional generated response 152.

In one embodiment, precision scorer 162 generates a precision score for one or more of the corresponding pairs of test responses 128 and additional generated responses 152 by tokenizing both responses, identifying unique tokens, finding common tokens between the responses, and dividing the number of common tokens by the total unique tokens in the generated response 152 to produce the precision score. The precision score quantifies the accuracy of the generation by the tuned LLM 134 by indicating the proportion of the additional generated response 152 that is relevant to the test response 128.

In one embodiment, the precision score further quantifies the extent to which tokens in the test response 128 occur in the generated response 152 in the same order. In one embodiment, this ordered precision may be measured using a longest common subsequence (LCS) analysis to find the longest sequence that can be derived from both test response 128 and generated response 152 by deleting some elements without changing the order of the remaining elements. The length of the LCS may be normalized to a value between 0 and 1 to generate the precision score.

In one embodiment, LLM criteria scorer 166 executes an additional LLM to generate a score, rating, or grade for one or more given criteria in response to a prompt to analyze the additional generated responses 152 for the criteria. In one embodiment, the LLM criteria scorer (i) loads or otherwise accesses the additional LLM model; (ii) accepts the generated responses 152, one or more of parsed test conversation 120, test prompts 126, test responses 128, and a selection of one or more criteria to be scored as inputs; (iii) loads a pre-configured prompt for the selected criteria; (iv) populates placeholders of the pre-configured prompt with information indicated by the placeholder, such as the generated response(s) 152, parsed test conversation 120, test prompts 126, test responses 128; (v) pass the populated prompt to the additional LLM to obtain the response of the additional LLM; (vi) parse the response to extract the numerical score for the criterion, for example using regular expression(s) that identify the numerical score; and (vii) output the extracted score, which is the rating by the additional LLM for the generated responses for the criterion. Example grading criteria and example grading prompts are shown and described above with reference to automatic evaluation for ChatBot 235.

In one embodiment, the steps of block 320 are performed by automatic LLM evaluator 110. At the conclusion of block 320, ChatBot tuning method 300 has produced an evaluation score 150 that represents how much the adjustments 140 have improved LLM performance at generating ChatBot responses to chat-style prompts. Processing continues to block 325.

At block 325, ChatBot tuning method 300 automatically signals that the fine-tuning of the tuned large language model 134 to operate as a ChatBot is complete in response to the evaluation score 150 satisfying a threshold 154. In one embodiment, ChatBot tuning method 300 further automatically deploys the tuned large language model 134 to a production environment to operate as a chatbot in response to the evaluation score satisfying the threshold. In one embodiment, ChatBot tuning method 300 initializes a deployment decider (such as deployment decider 112) to automatically determine whether to deploy 158 the tuned LLM 134 based on satisfying a threshold 154 for satisfactory ChatBot performance, or to repeat the fine-tuning process for further training epochs based on failure to satisfy the threshold 154.

In one embodiment, where the threshold 154 is not satisfied, ChatBot tuning method 300 signals that ChatBot tuning method 300 is to repeat so as to further fine-tune the tuned large language model 134, for example repeating beginning at block 310 above. Where the threshold 154 is satisfied, ChatBot tuning method 300 signals to initiate or cause automated deployment of the tuned large language model 134 to a production environment 156 for operation as a ChatBot for live interaction with users. Thus, ChatBot tuning method 300 automatically determines to deploy the tuned large language model 134 to a ChatBot task.

The deployment decider 112 defines a threshold (such as threshold 154) for the evaluation score 150 based on predetermined performance criteria for the LLM, such as improvement over a previous "best" evaluation score for ChatBot performance achieved by the LLM under a prior iteration of tuning. The deployment decider 112 then populates conditions of the threshold 154 by inputting at least the value of the evaluation score 150. The deployment decider 112 evaluates the populated threshold to determine whether the threshold evaluates to a value (such as a Boolean "TRUE") that indicates the threshold to be satisfied by the evaluation score, or to a value (such as a Boolean "FALSE") that indicates the threshold to remain unsatisfied by the evaluation score.

If the evaluation of the threshold shows improvement over the previous best score for ChatBot performance by at least the threshold amount, the deployment decider automatically deploys the tuned LLM 134 into the production environment 156 as a ChatBot. If the evaluation shows insufficient improvement in ChatBot performance by the tuned LLM 134, or even decrease in performance, the tuned LLM 134 is not deployed. Instead, the deployment decider 112 initiates further epochs of training with additional sample conversations 116 for the tuned LLM 134, restarting ChatBot tuning method 300 at block 310 for the tuned LLM. In this way, improvements captured in the tuned LLM that were not sufficient to justify deployment are retained and further refined with additional training, and not discarded.

In one embodiment, once the deployment decider has determined to deploy the tuned LLM 134, deployment decider 112 automatically carries out the promotion of the LLM to the production environment, for example as described above with reference to deployment decider 112. In one embodiment, the determination to deploy the tuned LLM 134 may be presented in a user interface, such as a graphical user interface, for user or administrator confirmation or rejection of the deployment.

In one embodiment, a condition of satisfying the threshold is surpassing a previous best (for example, exceeding a previous maximum) for the evaluation score. In one embodiment, the threshold is defined by retrieving a pre-specified threshold for ChatBot performance from storage. In one embodiment, the threshold is defined by dynamically adjusting threshold conditions based on the previous "best" evaluation score—a prior peak ability of the LLM to operate as a ChatBot. The previous "best" score may be, for example, a maximum score where higher evaluation scores indicate better ChatBot performance. The automatic LLM evaluator 110 may be configured to also store the previous best evaluation score that was previously achieved by a tuned LLM. In one embodiment, the previous best evaluation score may be set as a minimum to be exceeded in the threshold evaluation. In one embodiment, the value of the previous best evaluation score, plus a pre-determined margin of improvement, are set as the minimum to be exceeded in the threshold evaluation. Thus, in one embodiment, ChatBot tuning method 300 compares the evaluation score 150 to the previous best for the evaluation score.

In one embodiment, the steps of block 325 are performed by deployment decider 112. ChatBot tuning method 300 proceeds to END block 330, where ChatBot tuning method 300 terminates. At the conclusion of ChatBot tuning method 300, an LLM has been automatically fine-tuned for improved performance as a ChatBot responding to human language conversational prompts. And, in one embodiment, the LLM is automatically deployed to implement the improved ChatBot capabilities for ChatBot tasks going forward.

In one embodiment, a chatbot tuning method accesses a training collection of conversation data that includes conversations between humans and chatbots. The chatbot tuning method trains a large language model to approximate outputs of the chatbots in the training collection based on a loss function that includes components for similarity loss, integration loss, and stepwise loss between outputs generated by the LLM and the outputs of the chatbots. The chatbot tuning method accesses a testing collection of conversation data that includes second conversations between humans and chatbots. The chatbot tuning method generates an evaluation score for performance of the trained LLM as a chatbot based on recall of second outputs generated by the trained LLM, precision of the second outputs, and scores generated by the trained LLM for one or more criteria applied to the second outputs. Where the evaluation score exceeds a previous high, the chatbot tuning method outputs the trained LLM as fine-tuned for use as a chatbot.

Example Features of ChatBot Tuning Method

In one embodiment, ChatBot tuning method 300 further executes the chatbot loss function (discussed above at block 315) to penalize one or more of (i) dissimilarity of the collective first responses generated by the large language model to the collective example responses by the agent in the sample conversation, (ii) excessive rounds of conversation by the large language model in comparison to the sample conversation, and (iii) round-by-round dissimilarity of the first responses generated by the large language model to corresponding example responses by the agent in the sample conversation. In one embodiment, dissimilarity of the generated responses and the example responses is measured by cosine distance, for example, cosine distance(s) between the generated responses and the example responses.

In one embodiment, ChatBot tuning method 300 executes the chatbot loss function (discussed at block 315) to generate, as a component of the chatbot loss function, a similarity loss. The similarity loss indicates an extent to which the collective generated first responses are semantically dissimilar from the collective example responses. Semantic dissimilarity is measured by cosine distance.

In one embodiment, ChatBot tuning method 300 executes the chatbot loss function (discussed at block 315) to generate, as a component of the chatbot loss function, an integration loss. The integration loss indicates how rapidly the generated first responses arrive at an expected answer for the example conversation. Arrival at the expected answer is determined by one of the first responses satisfying thresholds for precision and recall with respect to the expected answer.

In one embodiment, ChatBot tuning method 300 executes the chatbot loss function (discussed at block 315) to generate, as a component of the chatbot loss function, a step-wise loss. The step-wise loss that indicates an extent to which the generated first responses are semantically dissimilar from their corresponding example responses in individual rounds of the example conversation. Here, again, semantic dissimilarity is measured by cosine distance.

And, in one embodiment, ChatBot tuning method 300 includes combining the similarity loss, integration loss, and stepwise loss into a ChatBot loss (as discussed at block 315). The resulting combined ChatBot loss is output by the ChatBot loss function.

In one embodiment, generating the evaluation score (discussed above at block 320) in ChatBot tuning method 300 is based on measures of recall and precision between (i) a response generated by the tuned LLM to a test prompt from a test conversation, and (ii) a test response to the test prompt from the test conversation. For example, to generate the evaluation score, ChatBot tuning method 300 further includes generating a value of recall between test responses from the test conversation and the generated second responses. Then, ChatBot tuning method 300 further includes generating a value of precision between the test responses and the generated second responses. And, ChatBot tuning method 300 further includes combining the values of recall and precision to produce the evaluation score.

In one embodiment, generating the evaluation score (discussed above at block 320) in ChatBot tuning method 300 is based on grading by an additional LLM of a response generated by the tuned LLM to a test prompt from a test conversation with respect to pre-specified criteria. For example, to generate the evaluation score, ChatBot tuning method 300 further includes automatically generating a grading prompt to an additional large language model that requests the additional large language model to grade the generated second responses for a particular criterion. Then, ChatBot tuning method 300 further includes automatically submitting the generated second generated responses and the prompt to the additional large language model to cause the additional large language model to generate a criterion score for the particular criterion based on the generated second responses. And, ChatBot tuning method 300 further includes generating the evaluation score based at least in part on the criterion score. In one embodiment, the particular criterion is one of non-repetitiveness of the second generated responses, human-readability of the second generated responses, relevance of the second generated responses to corresponding test prompts, conformance to first-person perspective, and conciseness. In one embodiment, ChatBot tuning method 300 grades the second generated responses with respect to a plurality of particular criteria.

In one embodiment, generating the evaluation score (discussed above at block 320) includes generating a value of recall between the test responses and the generated second responses. Generating the evaluation score includes generating a value of precision between the test responses and the generated second responses. Generating the evaluation score includes automatically generating a grading prompt to an additional large language model that requests the additional large language model to grade the generated second responses for a particular criterion. Generating the evaluation score includes automatically submitting the generated second generated responses and the prompt to the additional large language model to cause the additional large language model to generate a criterion score for the particular criterion based on the generated second responses. And, generating the evaluation score includes combining the value of recall, the value of precision, and the criterion score to produce the evaluation score. In one embodiment, the value of recall, the value of precision, and the criterion score (or where the second generated responses are graded for multiple criteria, the criterion scores) are averaged, with optional weighting, to combine the values into the evaluation score.

In one embodiment, a condition of satisfying the threshold (discussed at block 325) includes surpassing a previous best for the evaluation score. Here, ChatBot tuning method 300 further includes comparing the evaluation score to the previous best for the evaluation score. In one embodiment, the threshold provides that the previous best score is to be surpassed by a given amount, such as a percentage or quantity. For example, in one embodiment, the chatbot tuning method 300 further includes (1) comparing the evaluation score to a previous best for the evaluation score; and (2) determining that the threshold is satisfied where the evaluation score surpasses the previous best for the evaluation score by a pre-established amount.

In one embodiment, ChatBot tuning method 300 further includes parsing the sample conversations to extract the example prompts by the querent (e.g., customer) and the example responses by the agent (e.g., ChatBot).

In one embodiment, ChatBot tuning method 300 further includes, in response to the signaling that the fine-tuning of tuned large language model to operate as a chatbot is complete, automatically deploying the tuned large language model to a production environment to operate as a chatbot.

Cloud or Enterprise Embodiments

In one embodiment, the present system (such as ChatBot tuning system 100) is a computing/data processing system including a computing application or collection of distributed computing applications for access and use by other client computing devices that communicate with the present system over a network. In one embodiment, ChatBot tuning system 100 is a component of a time series data service that is configured to gather, serve, and execute operations on time series data. The applications and computing system may be configured to operate with or be implemented as a cloud-based network computing system, an infrastructure-as-a-service (IAAS), platform-as-a-service (PAAS), or software-as-a-service (SAAS) architecture, or other type of networked computing solution. In one embodiment the present system provides at least one or more of the functions disclosed herein and a graphical user interface to access and operate the functions. In one embodiment, ChatBot tuning system 100 is a centralized server-side application that provides at least the functions disclosed herein and that is accessed by many users by way of computing devices/terminals communicating with the computers of ChatBot tuning system 100 (functioning as one or more servers) over a computer network. In one embodiment ChatBot tuning system 100 may be implemented by a server or other computing device configured with hardware and software to implement the functions and features described herein.

In one embodiment, the components of ChatBot tuning system 100 may be implemented as sets of one or more software modules executed by one or more computing devices specially configured for such execution. In one embodiment, the components of ChatBot tuning system 100 are implemented on one or more hardware computing devices or hosts interconnected by a data network. For example, the components of ChatBot tuning system 100 may be executed by network-connected computing devices of one or more computing hardware shapes, such as central processing unit (CPU) or general-purpose shapes, dense input/output (I/O) shapes, graphics processing unit (GPU) shapes, and high-performance computing (HPC) shapes.

In one embodiment, the components of ChatBot tuning system 100 intercommunicate by electronic messages or signals. These electronic messages or signals may be configured as calls to functions or procedures that access the features or data of the component, such as for example application programming interface (API) calls. In one embodiment, these electronic messages or signals are sent between hosts in a format compatible with transmission control protocol/internet protocol (TCP/IP) or other computer networking protocol. Components of ChatBot tuning system 100 may (i) generate or compose an electronic message or signal to issue a command or request to another component, (ii) transmit the message or signal to other components of ChatBot tuning system 100, (iii) parse the content of an electronic message or signal received to identify commands or requests that the component can perform, and (iv) in response to identifying the command or request, automatically perform or execute the command or request. The electronic messages or signals may include queries against databases. The queries may be composed and executed in query languages compatible with the database and executed in a runtime environment compatible with the query language.

In one embodiment, remote computing systems may access information or applications provided by ChatBot tuning system 100, for example through a web interface server. In one embodiment, the remote computing system may send requests to and receive responses from ChatBot tuning system 100. In one example, access to the information or applications may be effected through use of a web browser on a personal computer or mobile device. In one example, communications exchanged with ChatBot tuning system 100 may take the form of remote representational state transfer (REST) requests using JavaScript object notation (JSON) as the data interchange format for example, or simple object access protocol (SOAP) requests to and from XML servers. The REST or SOAP requests may include API calls to components of ChatBot tuning system 100.

Software Module Embodiments

In general, software instructions are designed to be executed by one or more suitably programmed processors accessing memory. Software instructions may include, for example, computer-executable code and source code that may be compiled into computer-executable code. These software instructions may also include instructions written in an interpreted programming language, such as a scripting language.

In a complex system, such instructions may be arranged into program modules with each such module performing a specific task, process, function, or operation. The entire set of modules may be controlled or coordinated in their operation by an operating system (OS) or other form of organizational platform.

In one embodiment, one or more of the components described herein are configured as modules stored in a non-transitory computer readable medium. The modules are configured with stored software instructions that when executed by at least a processor accessing memory or storage cause the computing device to perform the corresponding function(s) as described herein.

Computing Device Embodiment

Figure 4:
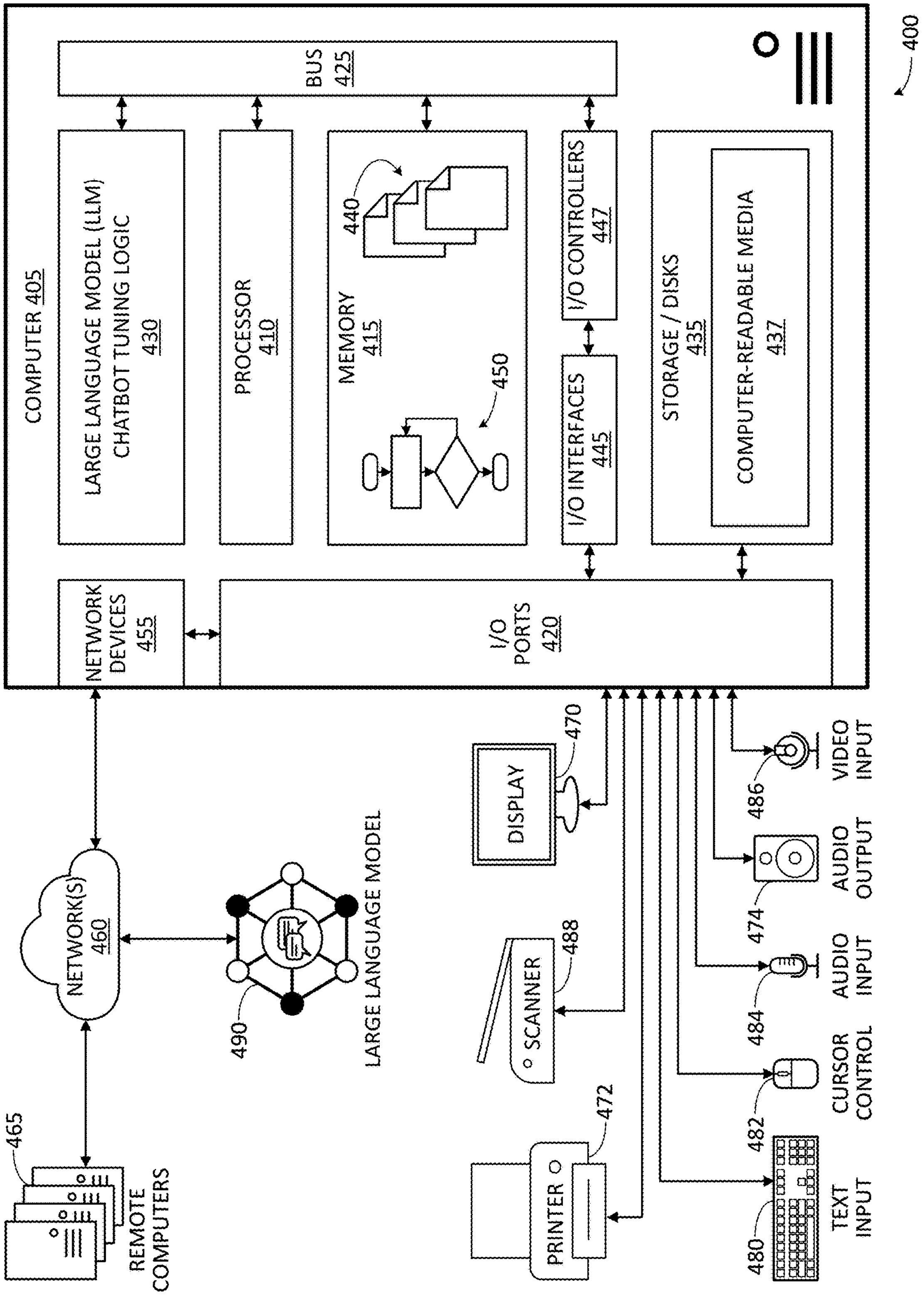
FIG. 4 illustrates an embodiment of a computing system configured with the example systems and/or methods disclosed.

FIG. 4 illustrates an example computing system 400 that is configured and/or programmed as a special purpose computing device(s) with one or more of the example systems and methods described herein, and/or equivalents. The example computing device may be a computer 405 that includes at least one hardware processor 410, a memory 415, and input/output ports 420 operably connected by a bus 425. In one example, the computer 405 may include large language model chatbot tuning logic 430 configured to facilitate automated fine-tuning of an LLM to improve the ability of the LLM to operate as a ChatBot, similar to systems, methods, and other embodiments shown in and described with reference to FIGS. 1, 2, and 3 above.

In different examples, the logic 430 may be implemented in hardware, one or more non-transitory computer-readable media 437 with stored instructions, firmware, and/or combinations thereof. While the logic 430 is illustrated as a hardware component attached to the bus 425, it is to be appreciated that in other embodiments, the logic 430 could be implemented in the processor 410, stored in memory 415, or stored in disk 435.

In one embodiment, logic 430 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an application-specific integrated circuit (ASIC) programmed to facilitate automated fine-tuning of an LLM to improve the ability of the LLM to operate as a ChatBot. The means may also be implemented as stored computer executable instructions that are presented to computer 405 as data 440 that are temporarily stored in memory 415 and then executed by processor 410.

Logic 430 may also provide means (e.g., hardware, non-transitory computer-readable medium that stores executable instructions, firmware) for performing one or more of the disclosed functions and/or combinations of the functions.

Generally describing an example configuration of the computer 405, the processor 410 may be a variety of various processors including dual microprocessor and other multi-processor architectures. A memory 415 may include volatile memory and/or non-volatile memory. Non-volatile memory may include, for example, read-only memory (ROM), programmable ROM (PROM), and so on. Volatile memory may include, for example, random access memory (RAM), static RAM (SRAM), dynamic RAM (DRAM), and so on.

A storage disk 435 may be operably connected to the computer 405 via, for example, an input/output (I/O) interface (e.g., card, device) 445 and an input/output port 420 that are controlled by at least an input/output (I/O) controller 447. The disk 435 may be, for example, a magnetic disk drive, a solid-state drive, a floppy disk drive, a tape drive, a Zip drive, a flash memory card, a memory stick, and so on. Furthermore, the disk 435 may be a compact disc ROM (CD-ROM) drive, a CD recordable (CD-R) drive, a CD rewritable (CD-RW) drive, a digital video disc ROM (DVD ROM) drive, and so on. The storage/disks thus may include one or more non-transitory computer-readable media. The memory 415 can store a process 450 and/or a data 440, for example. The disk 435 and/or the memory 415 can store an operating system that controls and allocates resources of the computer 405.

The computer 405 may interact with, control, and/or be controlled by input/output (I/O) devices via the input/output (I/O) controller 447, the I/O interfaces 445, and the input/output ports 420. Input/output devices may include, for example, one or more network devices 455, displays 470, printers 472 (such as inkjet, laser, or 3D printers), audio output devices 474 (such as speakers or headphones), text input devices 480 (such as keyboards), cursor control devices 482 for pointing and selection inputs (such as mice, trackballs, touch screens, joysticks, pointing sticks, electronic styluses, electronic pen tablets), audio input devices 484 (such as microphones or external audio players), video input devices 486 (such as video and still cameras, or external video players), image scanners 488, video cards (not shown), disks 435, and so on. The input/output ports 420 may include, for example, serial ports, parallel ports, and USB ports.

The computer 405 can operate in a network environment and thus may be connected to the network devices 455 via the I/O interfaces 445, and/or the I/O ports 420. Through the network devices 455, the computer 405 may interact with a network 460. Through the network 460, the computer 405 may be logically connected to remote computers 465. Networks with which the computer 405 may interact include, but are not limited to, a local area network (LAN), a wide area network (WAN), and other networks. Computer 405 may deliver prompts to a large language model 490 (that is operating in a production environment) and receive LLM-generated responses (such as human-language chat) from large language model 490 through networks 460. Computer 405 may also adjust or update configurations of large language model 490 through networks 460.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in one embodiment" does not necessarily refer to the same embodiment, though it may.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. Data may function as instructions in some embodiments. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. One or more non-transitory computer-readable media that include stored thereon computer-executable instructions that when executed by at least a processor cause a computing system to:

access a collection of sample conversations between two entities, wherein an individual sample conversation includes a plurality of rounds each including a natural language example prompt by a customer and an example response by an agent;

fine-tune a large language model to generate responses in natural language based on a chatbot loss function that evaluates first responses generated by the large language model to the natural language example prompts by the customer to produce a tuned large language model;

generate an evaluation score for performance of the tuned large language model as a chatbot based on second responses generated by the tuned large language model to test prompts from a test conversation, wherein the test conversation includes a plurality of rounds; and automatically determine to deploy the tuned large language model to a production environment to operate as a chatbot in response to the evaluation score satisfying a threshold.

2. The non-transitory computer-readable media of claim 1, wherein the computer-executable instructions further cause the computing system to execute the chatbot loss function to penalize each of (i) dissimilarity of the first responses generated by the large language model to the collective example responses by the agent in the individual sample conversation, (ii) excessive rounds of conversation by the large language model in comparison to the individual sample conversation, and (iii) round-by-round dissimilarity of the first responses generated by the large language model to corresponding example responses by the agent in the individual sample conversation.

3. The non-transitory computer-readable media of claim 2, wherein the computer-executable instructions further cause the computing system to measure dissimilarity of the first responses and the example responses by cosine distance.

4. The non-transitory computer-readable media of claim 1, wherein the computer-executable instructions to generate the evaluation score further cause the computing system to:

generate a value of recall between test responses corresponding to the test prompts from the test conversation and the generated second responses;

generate a value of precision between the test responses and the second responses; and combine the value of recall and the value of precision to produce the evaluation score.

5. The non-transitory computer-readable media of claim 1, wherein the computer-executable instructions to generate the evaluation score further cause the computing system to:

automatically generate a grading prompt to an additional large language model that requests the additional large language model to grade the second responses for a particular criterion;

automatically submit the second responses and the grading prompt to the additional large language model to cause the additional large language model to generate a criterion score for the particular criterion based on the second responses; and generate the evaluation score based at least in part on the criterion score.

6. The non-transitory computer-readable media of claim 5, wherein the particular criterion is one of non-repetitiveness of the second responses, human-readability of the second responses, relevance of the second responses to corresponding test prompts, conformance to first-person perspective, and conciseness.

7. The non-transitory computer-readable media of claim 1, wherein a condition of satisfying the threshold includes surpassing a previous best for the evaluation score, and wherein the computer-executable instructions further cause the computing system to compare the evaluation score to the previous best for the evaluation score.

8. A computing system, comprising:

at least one processor connected to at least one memory;

one or more non-transitory computer readable media including computer-executable instructions stored thereon that when executed by at least the processor cause the computing system to:

access a collection of sample conversations between two entities, wherein an individual sample conversation includes a plurality of rounds each including a natural language example prompt by a querent and an example response by an agent;

fine-tune a large language model to generate responses in natural language based on a chatbot loss function that evaluates first responses generated by the large language model to the natural language example prompts by the querent to produce a tuned large language model;

generate an evaluation score for performance of the tuned large language model as a chatbot based on second responses generated by the tuned large language model to test prompts from a test conversation, wherein the test conversation includes a plurality of rounds; and automatically deploy the tuned large language model to a production environment to operate as a chatbot in response to the evaluation score satisfying a threshold.

9. The computing system of claim 8, wherein the computer-executable instructions further cause the computing system to execute the chatbot loss function to generate, as a component of the chatbot loss function, a similarity loss that indicates an extent to which the first responses collectively are semantically dissimilar from the example responses collectively, wherein semantic dissimilarity is measured by cosine distance.

10. The computing system of claim 8, wherein the computer-executable instructions further cause the computing system to execute the chatbot loss function to generate, as a component of the chatbot loss function, an integration loss that indicates how rapidly the first responses arrive at an expected answer for the individual sample conversation, wherein arrival at the expected answer is determined by one of the first responses satisfying thresholds for precision and recall with respect to the expected answer.

11. The computing system of claim 8, wherein the computer-executable instructions further cause the computing system to execute the chatbot loss function to generate, as a component of the chatbot loss function, a step-wise loss that indicates an extent to which the first responses are semantically dissimilar from their corresponding example responses in individual rounds of the individual sample conversation, wherein semantic dissimilarity is measured by cosine distance.

12. The computing system of claim 8, wherein the computer-executable instructions to generate the evaluation score further cause the computing system to:

generate a value of recall between test responses corresponding to the text prompts from the test conversation and the second responses;

generate a value of precision between the test responses and the second responses;

automatically generate a grading prompt to an additional large language model that requests the additional large language model to grade the second responses for a particular criterion;

automatically submit the second responses and the grading prompt to the additional large language model to cause the additional large language model to generate a criterion score for the particular criterion based on the second responses; and combine the value of recall, the value of precision, and the criterion score to produce the evaluation score.

13. The computing system of claim 8, wherein the computer-executable instructions further cause the computing system to parse the sample conversations to extract the natural language example prompts by the querent and the example responses by the agent.

14. The computing system of claim 8, wherein a condition of satisfying the threshold includes surpassing a previous best for the evaluation score, and wherein the computer-executable instructions further cause the computing system to compare the evaluation score to the previous best for the evaluation score.

15. A computer-implemented method, comprising:

accessing a collection of sample conversations between two entities, wherein an individual sample conversation includes ene er more a plurality of rounds each including a natural language example prompt by a querent and an example response by an agent;

fine-tuning a large language model to generate responses in natural language based on a chatbot loss function that evaluates first responses generated by the large language model to the natural language example prompts by the querent to produce a tuned large language model;

generating an evaluation score for performance of the tuned large language model as a chatbot based on second responses generated by the tuned large language model to test prompts from a test conversation, wherein the test conversation includes a plurality of rounds; and automatically signaling that the fine-tuning of the tuned large language model to operate as a chatbot is complete in response to the evaluation score satisfying a threshold.

16. The computer-implemented method of claim 15, further comprising generating a chatbot loss as output from the chatbot loss function by:

generating a similarity loss that indicates an extent to which the first responses collectively are semantically dissimilar from the example responses collectively, wherein semantic dissimilarity is measured by cosine distance;

generating an integration loss that indicates how rapidly the first responses arrive at an expected answer for the individual sample conversation, wherein arrival at the expected answer is determined by one of the first responses satisfying thresholds for precision and recall with respect to the expected answer;

generating a step-wise loss that indicates an extent to which the first responses are semantically dissimilar from their corresponding example responses in individual rounds of the individual sample conversation; and combining the similarity loss, integration loss, and step-wise loss into the chatbot loss.

17. The computer-implemented method of claim 15, wherein generating the evaluation score further comprises:

generating a value of recall between test responses corresponding to the test prompts from the test conversation and the second responses;

generating a value of precision between the test responses and the d second responses; and combining the value of recall and the value of precision to produce the evaluation score.

18. The computer-implemented method of claim 15, wherein generating the evaluation score further comprises:

automatically generating a grading prompt to an additional large language model that requests the additional large language model to grade the second responses for a particular criterion, wherein the particular criterion is one of non-repetitiveness of the second responses, human-readability of the second responses, relevance of the second responses to corresponding test prompts, conformance to first-person perspective, and conciseness;

automatically submitting the second responses and the grading prompt to the additional large language model to cause the additional large language model to generate a criterion score for the particular criterion based on the second responses; and generating the evaluation score based at least in part on the criterion score.

19. The computer-implemented method of claim 15, further comprising:

comparing the evaluation score to a previous best for the evaluation score; and determining that the threshold is satisfied where the evaluation score surpasses the previous best for the evaluation score by a pre-established amount.

20. The computer-implemented method of claim 15, further comprising, in response to signaling that the fine-tuning of the tuned large language model to operate as a chatbot is complete, automatically deploying the tuned large language model to a production environment to operate as a chatbot.

* * * * *